United States Patent
Sugawara

(10) Patent No.: US 12,240,465 B2
(45) Date of Patent: Mar. 4, 2025

(54) ROAD DETERIORATION DIAGNOSING DEVICE, ROAD DETERIORATION DIAGNOSING METHOD, AND RECORDING MEDIUM

(71) Applicant: NEC Corporation, Tokyo (JP)

(72) Inventor: Chisato Sugawara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 363 days.

(21) Appl. No.: 17/910,610

(22) PCT Filed: Mar. 12, 2021

(86) PCT No.: PCT/JP2021/010099
§ 371 (c)(1),
(2) Date: Sep. 9, 2022

(87) PCT Pub. No.: WO2021/200038
PCT Pub. Date: Oct. 7, 2021

(65) Prior Publication Data
US 2023/0135985 A1 May 4, 2023

(30) Foreign Application Priority Data
Mar. 31, 2020 (JP) .................................. 2020-062852

(51) Int. Cl.
*G06T 7/11* (2017.01)
*B60W 40/06* (2012.01)
*G06T 7/00* (2017.01)
*G06V 20/56* (2022.01)

(52) U.S. Cl.
CPC .............. *B60W 40/06* (2013.01); *G06T 7/00* (2013.01); *G06V 20/588* (2022.01); *B60W 2420/403* (2013.01); *G06T 2207/30252* (2013.01)

(58) Field of Classification Search
CPC .......... G06K 9/00261; G06K 9/00288; G06K 9/00228; G06K 9/00268; G06K 9/00281;
(Continued)

(56) References Cited

U.S. PATENT DOCUMENTS

2016/0292518 A1* 10/2016 Banitt ..................... G06V 20/56
2018/0195973 A1 7/2018 Yonekawa et al.
(Continued)

FOREIGN PATENT DOCUMENTS

CN 110390664 A * 10/2019
JP 2018-021375 A 2/2018
(Continued)

OTHER PUBLICATIONS

JP Office Action for JP Application No. 2022-511769, mailed on Nov. 21, 2023 with English Translation.
(Continued)

*Primary Examiner* — Quan M Hua
(74) *Attorney, Agent, or Firm* — Sughrue Mion, PLLC

(57) ABSTRACT

A road deterioration diagnosing device acquires an image capturing a road and a date and a time when the image was captured as well as a location and a direction in which the image was captured, detects deterioration of the road surface shown in the acquired image, calculates a direction in which a shadow of a building may be formed over the road surface shown in the image using the date, the time, the location, and the direction, and determines a possibility of erroneous detection of the deterioration on the basis of the direction in which the road surface deteriorates and the direction in which the shadow may be formed.

10 Claims, 17 Drawing Sheets

(58) Field of Classification Search
CPC ......... G06K 9/6202; G06K 2009/4666; G06K 9/00362; G06K 9/4642; G06K 9/6206; G06K 9/6255; G06K 9/6256; G06K 9/00275; G06K 9/00308; G06K 9/00926; G06K 9/3233; G06K 9/4671; G06K 9/6215; G06K 9/6228; G06K 9/6262; G06K 9/627; G06K 9/6276; G06K 9/629; G06N 3/0454; G06N 3/084; G06N 3/08; G06T 11/00; G06T 2207/10016; G06T 2207/10024; G06T 2207/20081; G06T 2207/30201; G06T 2207/30241; G06T 2207/30244; G06T 7/251; G06T 7/74; G06T 7/80

See application file for complete search history.

(56) References Cited

U.S. PATENT DOCUMENTS

2019/0279001 A1 9/2019 Yamazaki et al.
2019/0318179 A1 10/2019 Jiang et al.
2020/0088341 A1* 3/2020 Tabaian .................. F16L 55/38
2021/0082098 A1* 3/2021 Kumbhare ............ G06T 7/0004

FOREIGN PATENT DOCUMENTS

| JP | 2018036769 A | * | 3/2018 |
| JP | 2018-087484 A | | 6/2018 |
| JP | 2019-144608 A | | 6/2019 |
| JP | 2019-154017 A | | 9/2019 |
| WO | 2018/131165 A1 | | 7/2018 |

OTHER PUBLICATIONS

International Search Report for PCT Application No. PCT/JP2021/010099, mailed on Apr. 13, 2021.

English translation of Written opinion for PCT Application No. PCT/JP2021/010099, mailed on Apr. 13, 2021.

* cited by examiner

Fig.3

| VEHICLE ID | PHOTOGRAPHING DATE | PHOTOGRAPHING TIME | PHOTOGRAPHING POINT | PHOTOGRAPHING DIRECTION | IMAGE FILE |
|---|---|---|---|---|---|
| 1 | 2020/3/13 | 13:00:00 | A1_1 | 90 | IMAGE 1 |
| 1 | 2020/3/13 | 13:00:05 | A1_2 | 90 | IMAGE 2 |
| 1 | 2020/3/13 | 13:00:10 | A1_3 | 85 | IMAGE 3 |
| 1 | 2020/3/13 | 13:00:15 | A1_4 | 45 | IMAGE 4 |
| 1 | 2020/3/13 | 13:00:20 | A1_5 | 45 | IMAGE 5 |
| 1 | 2020/3/13 | 13:00:25 | A1_6 | 35 | IMAGE 6 |
| 1 | 2020/3/13 | 13:00:30 | A1_7 | 30 | IMAGE 7 |
| 1 | 2020/3/13 | 13:00:35 | A1_8 | 25 | IMAGE 8 |
| ... | ... | ... | ... | ... | ... |

ROAD DETERIORATION DIAGNOSING DEVICE, ROAD DETERIORATION DIAGNOSING METHOD, AND RECORDING MEDIUM

This application is a National Stage Entry of PCT/JP2021/010099 filed on Mar. 12, 2021, which claims priority from Japanese Patent Application 2020-062852 filed on Mar. 31, 2020, the contents of all of which are incorporated herein by reference, in their entirety.

TECHNICAL FIELD

The present disclosure relates to a road deterioration diagnosing device, a road deterioration diagnosing method, and a recording medium.

BACKGROUND ART

In road deterioration diagnosis, a device that automatically detects a crack by analyzing a road surface image captured from a vehicle by a computer is being introduced.

Patent Literatures 1 and 2 disclose a crack detection processing device that analyzes a road surface image obtained by capturing a road surface and detects a crack of the road surface based on an analysis result.

In the crack detection based on image analysis as in Patent Literatures 1 and 2, there is a possibility that a shadow of a structure on a road surface is erroneously detected as a crack. An example of a technology for preventing such erroneous detection is described in Patent Literature 3.

The technology of Patent Literature 3 specifies a location of a shadow caused by sunlight in a captured image and compares the location of the shadow and a location of a crack in the image to determine the erroneous detection such as detecting the shadow as the crack. In the technology of Patent Literature 3, a location of a shadow reflected on a road surface of a captured image is obtained based on point cloud data of a structure such as a building or an overhead line obtained by laser scanning the structure and a location of the sun on a celestial sphere at a specific time calculated from astronomical data or a calculation formula.

CITATION LIST

Patent Literature

[PTL 1] JP 2019-144608 A
[PTL 2] JP 2018-087484 A
[PTL 3] JP 2018-036769 A

SUMMARY OF INVENTION

Technical Problem

In the system disclosed in Patent Literature 3, a laser scanner is required to specify the location of the shadow in the image. Therefore, the system becomes expensive, and the use or maintenance of the system is not easy.

An object of the present disclosure provides a road deterioration detection device, a road deterioration detection method, and a recording medium capable of solving the above-described problems and inexpensively and easily preventing erroneous detection of road deterioration due to a shadow of a structure.

Solution to Problem

According to an aspect of the present disclosure, a road deterioration diagnosing device includes an acquisition means configured to acquire an image capturing a road, and a date, a location, a time, and a direction in which the image is captured, a detection means configured to detect deterioration of a road surface shown in the acquired image, a calculation means configured to calculate a direction in which a shadow of a structure may be formed on the road surface of the image using the date, location, time, and direction, and a determination means configured to determine a possibility of erroneous detection of the deterioration based on the direction in which the road surface deteriorates and the direction in which the shadow may be formed.

According to an aspect of the present disclosure, a road deterioration diagnosing method includes acquiring an image capturing a road surface, and a date, a location, a time, and a direction in which the image is captured, detecting deterioration of a road surface shown in the acquired image, calculating a direction in which a shadow of a structure may be formed on the road surface of the image based on the date, location, time, and direction, and determining a possibility of erroneous detection of the deterioration based on the direction in which the road surface deteriorates and the direction in which the shadow may be formed.

According to an aspect of the present disclosure, a computer-readable recording medium stores a program allowing a computer to acquire an image capturing a road surface, and a date, a location, a time, and a direction in which the image is captured, detect deterioration of a road surface shown in the acquired image, calculate a direction in which a shadow of a structure may be formed on the road surface of the image based on the date, location, time, and direction, and determine a possibility of erroneous detection of the deterioration based on the direction in which the road surface deteriorates and the direction in which the shadow may be formed.

Advantageous Effects of Invention

The effect of the present disclosure can inexpensively and easily prevent erroneous detection of deterioration of a road due to a shadow of a structure.

BRIEF DESCRIPTION OF DRAWINGS

FIG. 3 is an example of image information in the first example embodiment.

EXAMPLE EMBODIMENT

Figure 1:
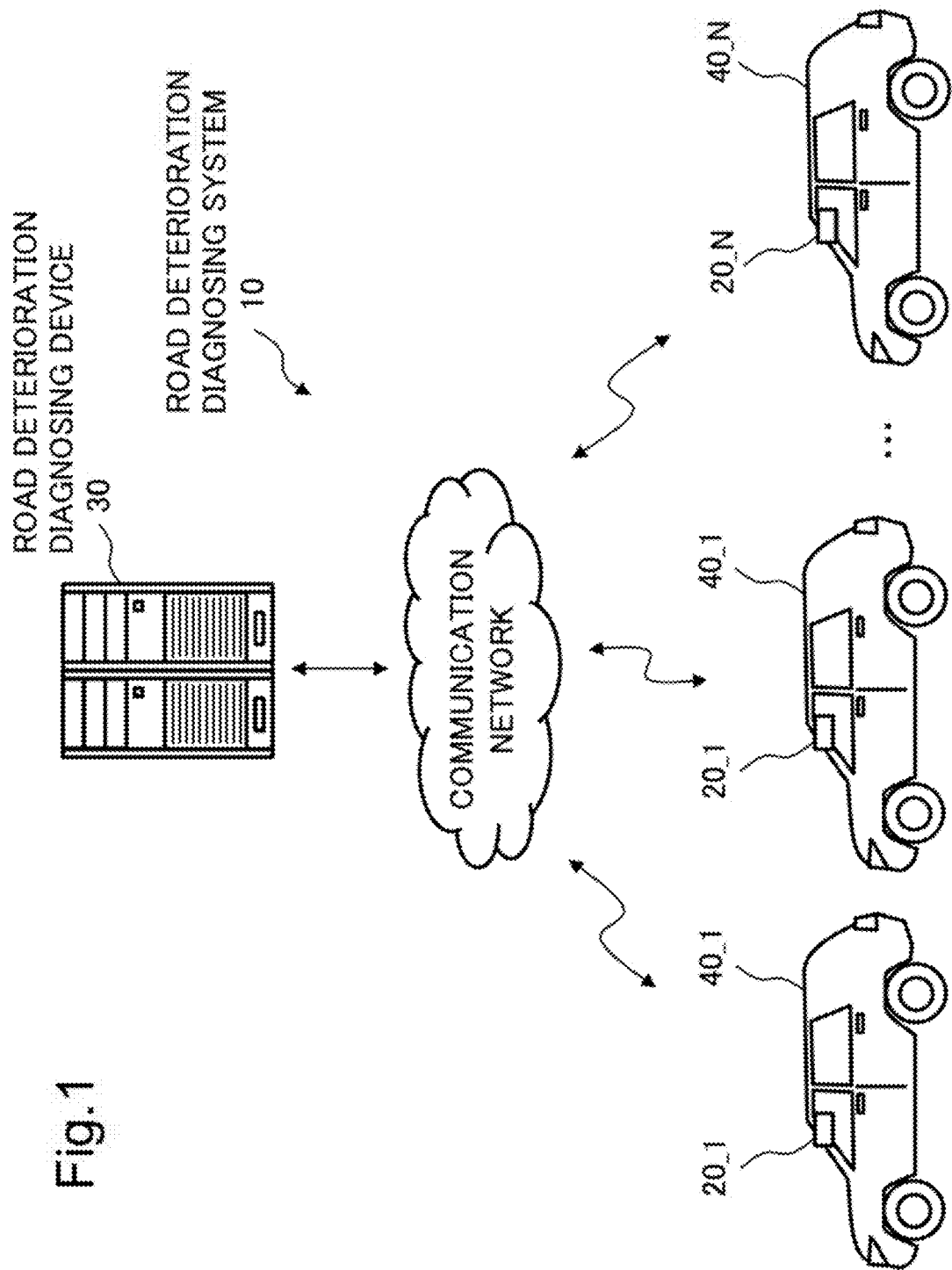
FIG. 1 is a schematic diagram illustrating an outline of a road deterioration diagnosing system 10 according to a first example embodiment.

Example embodiments will be described in detail with reference to the drawings. In the respective drawings and the respective example embodiments described in the specification, the same reference numerals are given to the same components, and the description thereof will be omitted as appropriate.

First Example Embodiment

A first example embodiment will be described.

First, a configuration of a road deterioration diagnosing system according to the first example embodiment will be described. FIG. 1 is a schematic diagram illustrating an outline of a road deterioration diagnosing system 10 according to the first example embodiment. Referring to FIG. 1, the road deterioration diagnosing system 10 includes a plurality of imaging devices 20_1, 20_2, . . . 20_N (N represents a natural number) (hereinafter, collectively referred to as an imaging device 20), a road deterioration diagnosing device 30, and a plurality of vehicles 40_1, 40_2, . . . 40_N (N represents a natural number) (hereinafter, collectively referred to as a vehicle 40).

In the road deterioration diagnosing system 10, the imaging devices 20_1, 20_2, . . . 20_N each are mounted on vehicles 40_1, 40_2, . . . 40_N belonging to an institution that manages roads such as a province autonomous community or a road management company. In addition, in the road deterioration diagnosing system 10, the road deterioration diagnosing device 30 and the imaging devices 20_1, 20_2, . . . 20_N are connected in such a way as to be able to communicate via a communication network, for example.

The road deterioration diagnosing device 30 is disposed in, for example, a road management department of the above-described institution. Note that the road deterioration diagnosing device 30 may be disposed in a place other than the road management department of the above-described institution. In this case, the road deterioration diagnosing device 30 may be achieved by a cloud computing system. In the present example embodiment, a case where the imaging device 20 is mounted on the vehicle 40 will be described. In this case, the imaging device 20 may be, for example, a drive recorder mounted on a vehicle. In addition, the imaging device 20 may be mounted on another moving body such as a bicycle or a drone, or a person may carry the imaging device 20. Furthermore, the imaging device is not limited to a moving body, and may be a fixed/fixed point camera or the like.

Figure 2:
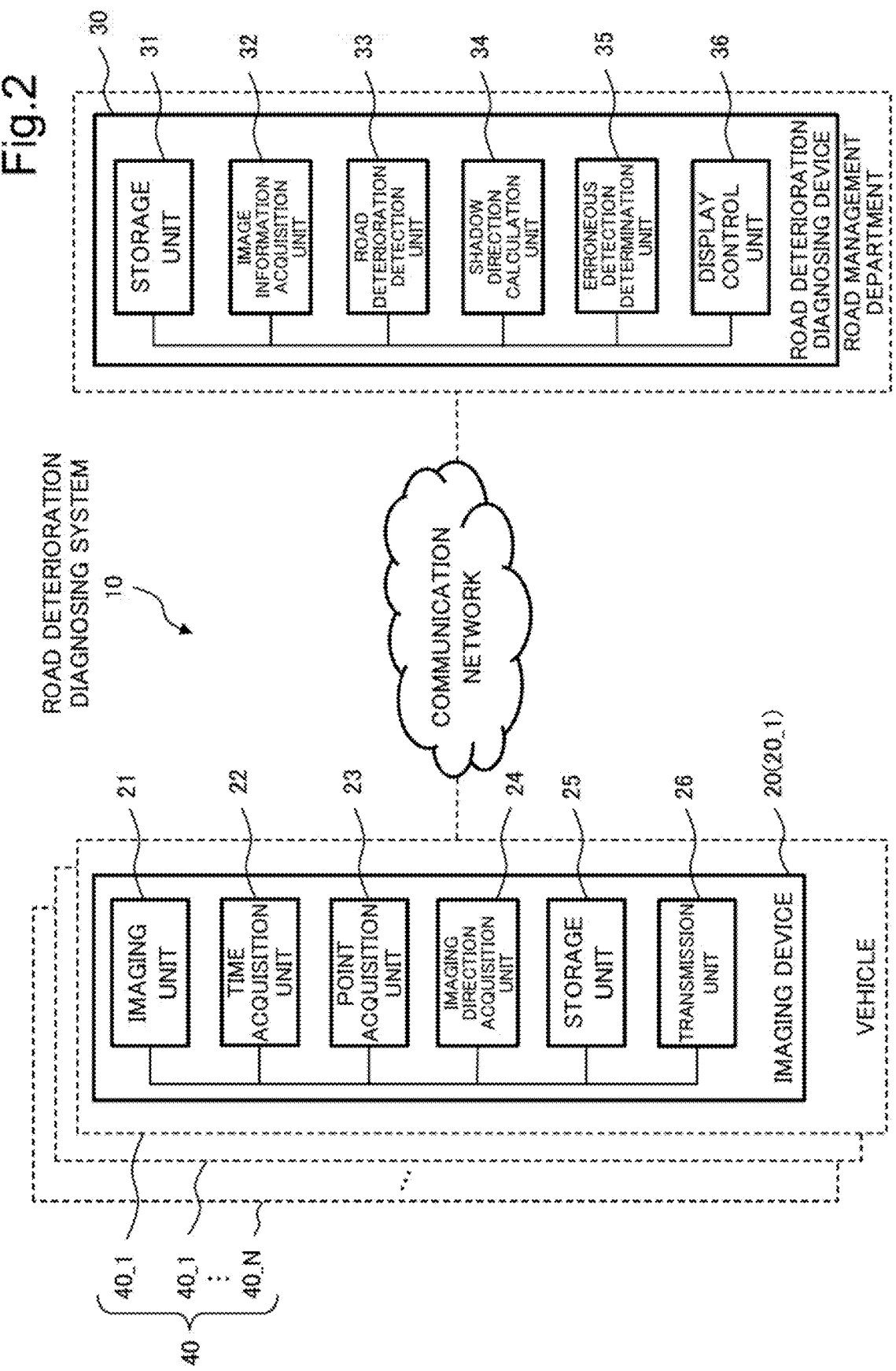
FIG. 2 is a block diagram illustrating an example of a configuration of the road deterioration diagnosing system 10 according to the first example embodiment.

Next, a configuration of each device will be described with reference to FIG. 2. FIG. 2 is a block diagram illustrating an example of a configuration of the road deterioration diagnosing system 10 according to the first example embodiment.

(Configuration of Imaging Device)

As illustrated in FIG. 2, the imaging device 20 includes an imaging unit 21, a time acquisition unit 22, a point acquisition unit 23, a capturing direction acquisition unit 24, a storage unit 25, and a transmission unit 26.

The imaging unit 21 captures an image of a road on which a vehicle 40 travels. The imaging unit 21 captures surroundings of the vehicle 40 at predetermined intervals while the vehicle 40 is traveling on a road. The image obtained by the capturing includes a road in front of the vehicle 40 and surroundings of the road. Furthermore, in a case where the imaging device 20 is mounted on a moving object in general, an image obtained by imaging is an image of a road on which the moving object moves and the surroundings of the road, and in a case of a person, the image is an image of a road on which a person moves and the surroundings of the road.

The time acquisition unit 22 acquires a date and time (hereinafter, also described as capturing date and capturing time) when the imaging unit 21 has captured an image. The time acquisition unit 22 outputs the capturing date and the capturing time to the imaging unit 21.

The point acquisition unit 23 acquires a point (hereinafter, also referred to as a capturing point) captured by the imaging unit 21. The point acquisition unit 23 is, for example, a global positioning system (GPS) receiver, and may be included in the imaging unit 21 or may be a separate unit. The point acquisition unit 23 outputs the imaging point to the imaging unit 21.

The capturing direction acquisition unit 24 acquires a direction (orientation) (hereinafter, also referred to as a capturing direction) in which the imaging unit 21 has captured an image. The imaging device 20 is installed near a windshield of the vehicle 40 at a place where it is easy to capture the road and the surroundings of the road. In this case, the imaging device 20 is installed in the vehicle 40 in such a way that the capturing direction is the same as the traveling direction of the vehicle 40. In addition, the capturing direction may be expressed using a 360° expression (azimuth expressing north as 0°, east as 90°, south as 180°, and west as 270°, that is, orientation expressed as 0° to 360° clockwise) that can express a direction (orientation) in detail.

The capturing direction acquisition unit 24 is, for example, a six-axis sensor in which an acceleration sensor capable of detecting three directions of left, right, up, and down, and a geomagnetic sensor capable of detecting north, south, east, and west are combined. In addition, the capturing direction acquisition unit 24 may set the front of the vehicle as the capturing direction, and estimate a traveling direction (capturing direction) of the vehicle from difference information between immediately preceding or immediately succeeding location information and current location information using the location information obtained by the point acquisition unit 23. The capturing direction acquisition unit 24 outputs the capturing direction to the imaging unit 21.

The imaging unit 21 acquires a capturing date and a capturing time from the time acquisition unit 22, acquires a capturing point from the point acquisition unit 23, acquires a capturing direction from the capturing direction acquisition unit 24, and associates the capturing date, the capturing time, the capturing point, and the capturing direction with the captured image and store the captured image in the storage unit 25 as the image information.

The storage unit 25 stores a vehicle identifier (ID). In addition, the storage unit 25 stores image information. The storage unit 25 may be, for example, a portable storage medium such as a random access memory (RAM) or a universal serial bus (USB) memory.

In addition, when the storage unit 25 is a portable storage medium such as a USB memory, an image of the USB memory may be directly read by the road deterioration diagnosing device 30. In this case, for example, a driver of the vehicle 40 may pass the USB memory storing the image to an operator of the road deterioration diagnosing device 30, and the operator may cause the road deterioration diagnosing device 30 to read the USB memory.

The transmission unit 26 acquires image information from the storage unit 25, and transmits the acquired image information to the road deterioration diagnosing device 30 via the communication network. The transmission of the image information may be, for example, a mode in which image information including an image is transmitted every time the image is captured, or a mode in which image information including each of one or more images captured in each period is transmitted every predetermined period.

(Configuration of Road Deterioration Diagnosing Device)

The road deterioration diagnosing device 30 includes a storage unit 31, an image information acquisition unit 32, a road deterioration detection unit 33, a shadow direction calculation unit 34, an erroneous detection determination unit 35, and a display control unit 36. The image information acquisition unit 32, the road deterioration detection unit 33, the shadow direction calculation unit 34, and the erroneous detection determination unit 35 are an example embodiment of an acquisition means, a detection means, a calculation means, and a determination means, respectively, in the present disclosure. Part or all of the components of the road deterioration diagnosing device 30 may be implemented by a cloud computing system as described above. For example, the storage unit 31, the image information acquisition unit 32, the road deterioration detection unit 33, the shadow direction calculation unit 34, and the erroneous detection determination unit 35 may be arranged on a cloud, and the display control unit 36 may be arranged in a road management department.

In addition, the road deterioration diagnosing device 30 diagnoses deterioration of a road surface of a road. Here, examples of the deterioration of the road surface include unevenness, a rut, a crack, and a pot hole of the road surface. Hereinafter, in the present example embodiment, a case where deterioration of a road surface is a crack will be described as an example.

The storage unit 31 stores the image information acquired by the image information acquisition unit 32. FIG. 3 is an example of image information in the first example embodiment. In FIG. 3, the image information is image information related to the vehicle 40 having a vehicle ID "1". Referring to FIG. 3, as an example, image information from a capturing time 13:00:00 to 13:00:35 every 5 seconds on the capturing date of Mar. 13, 2020 is illustrated. For example, at the capturing time 13:00:00, a capturing point is A1_1, a capturing direction is 90°, and an image file image is 1.

Here, although it is simply expressed as A1_1 as the capturing point, it may be a latitude and longitude such as "north latitude 35° 39'29"1572" "east longitude 135° 26'7"2539". In addition, the capturing direction 90° indicates east in the above-described 360° expression. The image 1 may be a still image or a moving image. In a case where the image 1 is a moving image, in the example of the capturing time 13:00:00, the image 1 may be, for example, a moving image from the capturing time 13:00:00 to 13:00:04.

In addition, the image information is not limited to the vehicle ID, the captured image, the capturing time, the capturing point, and the capturing direction, and may include other information. When the capturing date is not included in the image information received from the imaging device 20, a date managed by the road deterioration diagnosing device 30 may be added to the image information at the time of the reception.

The image information acquisition unit 32 receives the image information transmitted from the imaging device 20 via the communication network. The image information acquisition unit 32 stores the acquired image information in the storage unit 31. The image information acquisition unit 32 acquires image information of a road deterioration diagnosis target from the image information stored in the storage unit 31. In addition, the image information acquisition unit 32 may read (acquire) image information of a road deterioration diagnosis target from a storage medium such as a USB memory.

The road deterioration detection unit 33 detects a crack, which is deterioration of a road surface, by performing image analysis on an image included in the image information acquired from the storage unit 31. In this image analysis, for example, the road deterioration detection unit 33 may be configured to extract a road region from the acquired image and detect a crack of a road surface in the road region.

Figure 4:
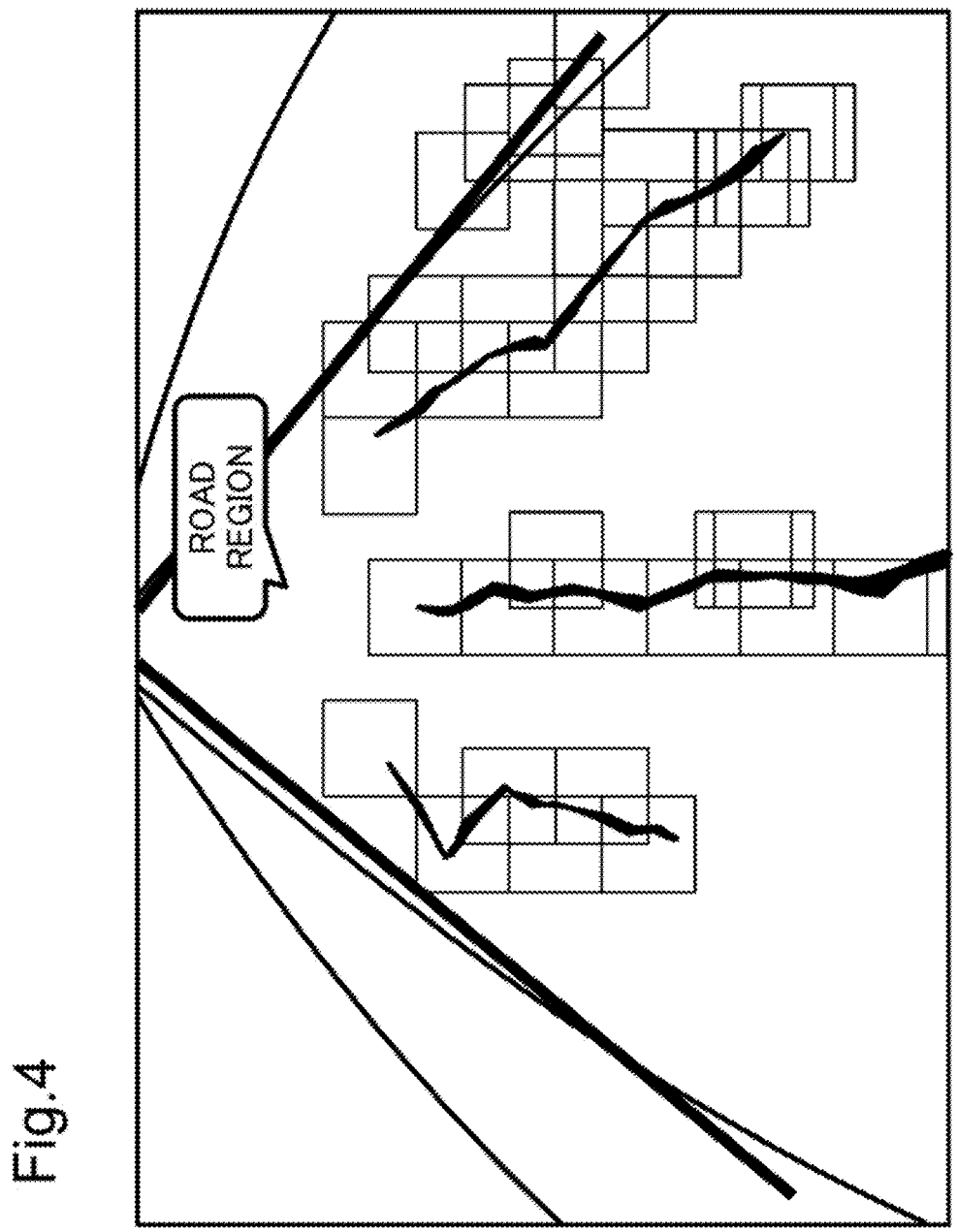
FIG. 4 is an example of detecting road deterioration (cracking) by an image recognition technology in the first example embodiment.

FIG. 4 is an example of detecting road deterioration (cracking) by an image recognition technology in the first example embodiment. In FIG. 4, in the extracted road region, a plurality of rectangles are shown along the detected crack. Here, for example, in a case where a road region extracted by image analysis is divided into a plurality of partial regions and the presence or absence of road deterioration (cracking) is determined for each partial region, the rectangle indicates a partial region where road deterioration (cracking) is detected. Hereinafter, such a rectangle indicating a partial region where road deterioration (cracking) is detected is also referred to as a target patch.

The road deterioration detection unit 33 analyzes the detected crack and detects a direction (orientation) of the crack. The road deterioration detection unit 33 may determine a direction (orientation) of the crack using, for example, an arrangement of target patches on the analysis image and a capturing direction included in the image information as illustrated in FIG. 4. Details of a method of calculating a crack direction (orientation) will be described later.

The shadow direction calculation unit 34 calculates a direction in which a shadow may be formed on the road surface of the image from the image information including the image analyzed by the road deterioration detection unit 33 by using the capturing date, the capturing time, the capturing point, and the capturing direction. The shadow direction calculation unit 34 estimates the location of the sun using the capturing date, the capturing time, and the capturing point. The shadow direction calculation unit 34 estimates a direction in which a shadow (hereinafter, also described as shadow direction) may be formed from the estimated location of the sun. Note that the method of estimating a location of the sun and the method of estimating a shadow direction may use a general method to be described later.

The erroneous detection determination unit 35 compares the direction (orientation) in which the target patches are arranged with the shadow direction, and calculates an angle θ of these directions (orientations). For example, when the direction (orientation) in which the plurality of target patches are arranged is 300° and the shadow direction is 305° in the above-described 360° expression, the erroneous detection determination unit 35 determines that the angle θ is 5°.

In a case where the angle θ is smaller than a predetermined threshold, the erroneous detection determination unit 35 determines that there is a high possibility that the detected crack is a shadow of the structure, and determines that the detection of the crack is erroneous detection. In addition, where the angle θ is smaller than a predetermined threshold, the erroneous detection determination unit 35 determines that there is a high possibility that the detected crack is the shadow of the structure, and determines that the detection of the crack is not erroneous detection.

The display control unit 36 acquires the analyzed image from the road deterioration detection unit 33 and displays the image on the display device. The image displayed on the display device by the display control unit 36 is, for example, a display example illustrated in FIG. 4. In addition, when the erroneous detection determination unit 35 determines that the detected crack is an erroneous detection, the display control unit 36 may change the display method of the target patch for the crack determined to be an erroneous detection. For example, the display control unit 36 may highlight the target patch of the crack determined to be erroneously detected by, for example, blinking.

Next, an operation of the first example embodiment will be described.

(Road Deterioration Diagnosis Processing)

The road deterioration diagnosis processing in the road deterioration diagnosing device 30 will be described.

Figure 5:
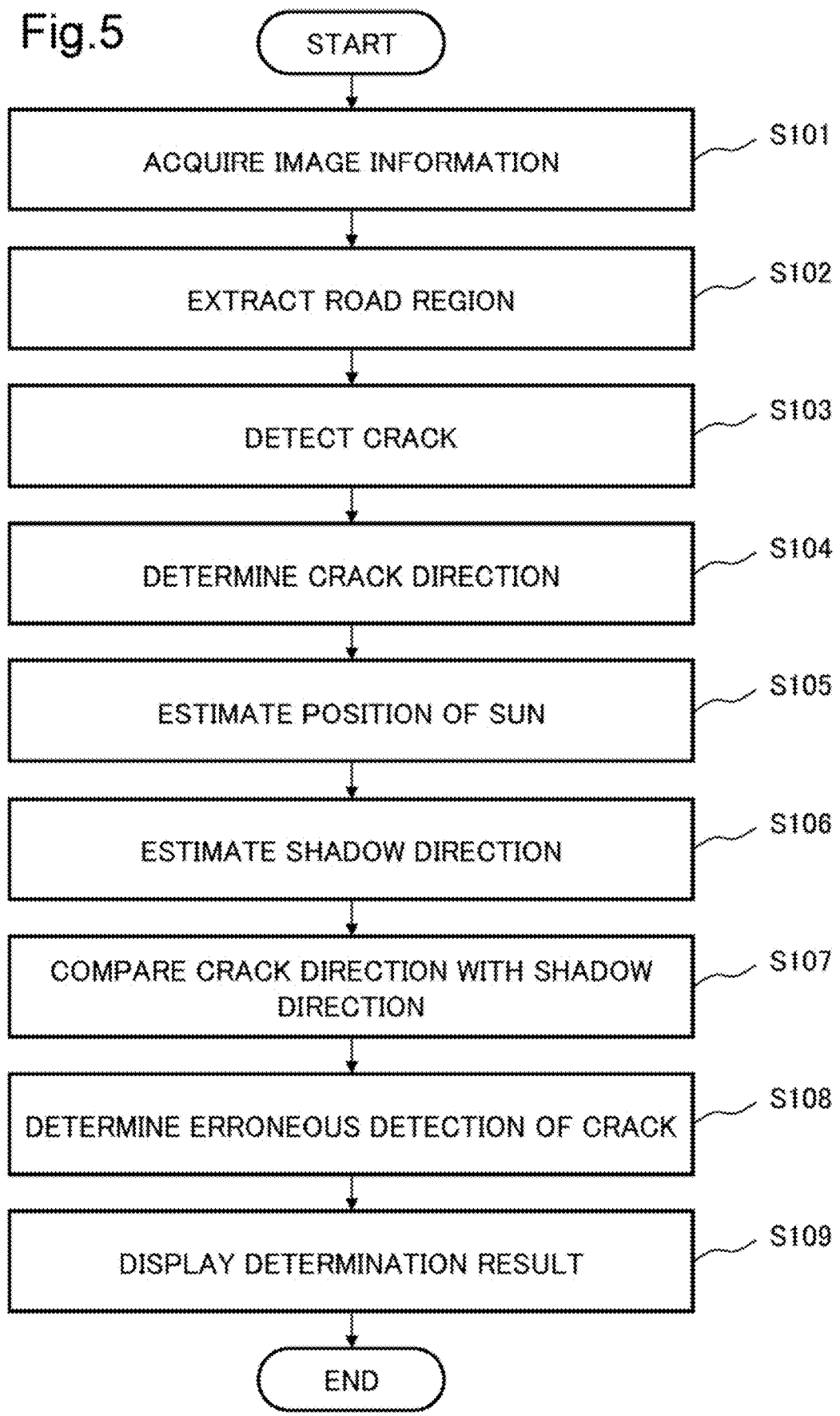
FIG. 5 is a flowchart illustrating road deterioration diagnosis processing in the first example embodiment.

FIG. 5 is a flowchart illustrating road deterioration diagnosis processing in the first example embodiment. The road deterioration diagnosis processing is executed, for example, when an instruction to execute a road deterioration diagnosis is input by an operator or the like after the road deterioration diagnosing device 30 receives image information from the imaging device 20 of each vehicle 40. In the input of the execution instruction, for example, a target section in which road deterioration is detected is designated.

In the operation of the first example embodiment, it is assumed that the image information received from the imaging device 20 is stored in the storage unit 31.

The image information acquisition unit 32 acquires image information of a capturing point matching the target section from the storage unit 31 (step S101). Note that the image information acquisition unit 32 may acquire an image from a storage unit such as a database connected via a communication network. In addition, the image information acquisition unit 32 may acquire an image from a storage medium such as a USB memory or an SD card.

The road deterioration detection unit 33 extracts a road region from the image of the image information acquired from the imaging device 20 (step S102). Here, the road deterioration detection unit 33 detects a road region using, for example, an image recognition technology. In this case, artificial intelligence (AI) obtained by learning an image of a road region by machine learning or deep learning may be used as the image recognition technology. In addition, the road deterioration detection unit 33 may detect a road region by, for example, Hough transform.

In the Hough transform, for example, in an edge image obtained by performing the edge extraction processing on the acquired image, each point of the extracted edge is set as an origin, and a straight line passing through each point is obtained using a distance from the origin to each point of the edge and an angle from the origin to each point. Then, in the Hough transform, a straight line passing through each point is transformed into a space (parameter space) between a distance and an angle, which is a parameter representing the straight line of each point, and a point at which parameters of each straight line match is calculated, thereby detecting the straight line in the edge image.

Here, with reference to FIGS. 6 and 7, an example of mapping of the road region extracted by the road deterioration detection unit 33 onto a plan view will be described.

Figure 6:
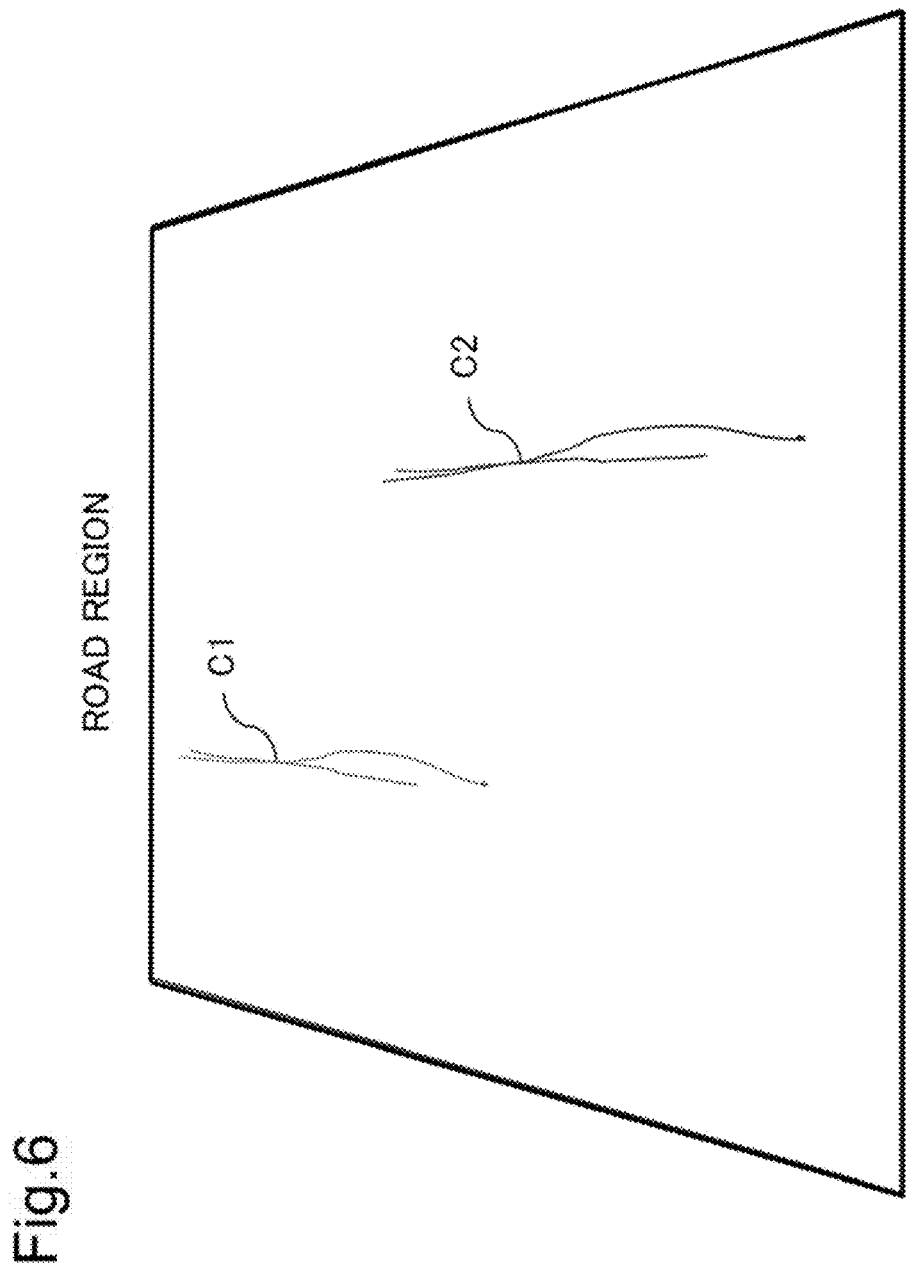
FIG. 6 is a schematic diagram of a case where a road is captured by a camera in the first example embodiment.

FIG. 6 is a schematic diagram of a case where a road is captured by a camera in the first example embodiment. FIG. 6 illustrates a crack C1 and a crack C2. In general, in a perspective image captured by a camera, even if both sides of a road are straight roads extending in parallel, the road extends toward a point on both sides of the road, that is, a vanishing point. That is, objects of the same size have different sizes on a front side (side close to a vehicle) and a back side (side far from a vehicle) of the captured image. Therefore, as illustrated in FIG. 6, cracks of the same size appear large on the front side of the captured image and appear small on the back side of the captured image. Therefore, the direction and the size of the crack may be accurately detected by mapping the image of the detected road region on a plan view as if the road surface is viewed from above.

Figure 7:
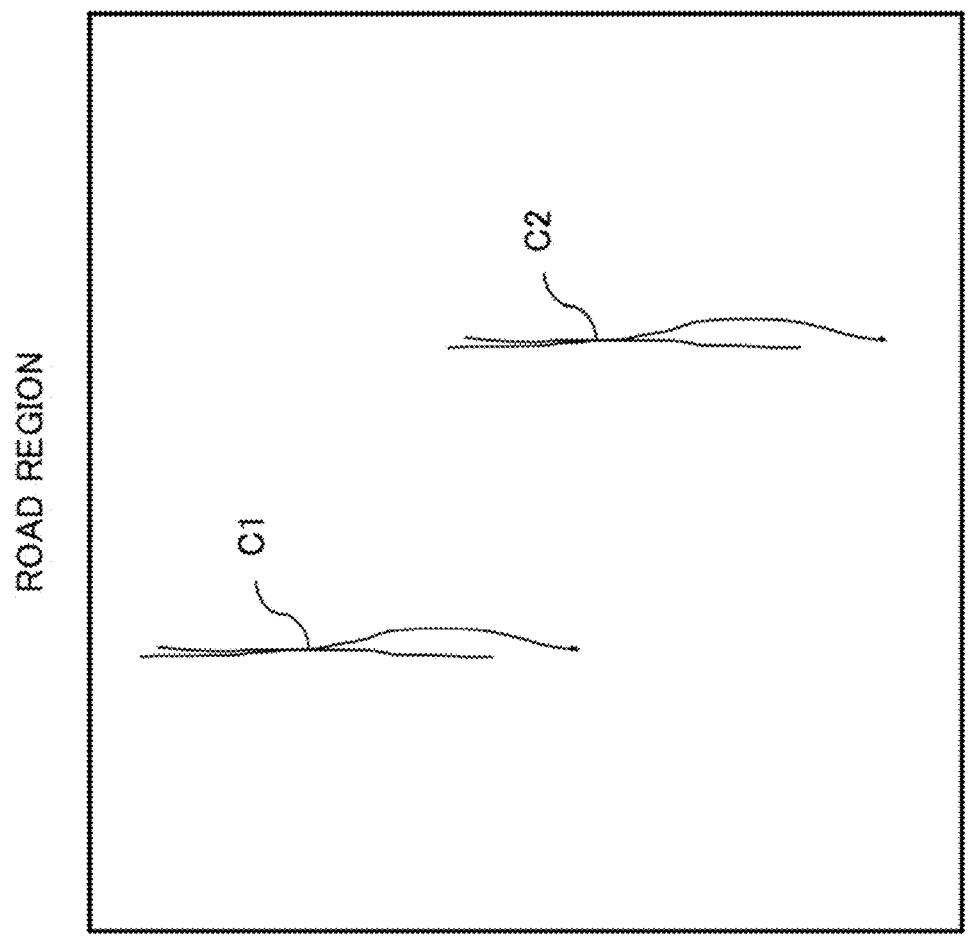
FIG. 7 is a schematic diagram illustrating an example in which a road region is mapped on a plan view in the first example embodiment.

FIG. 7 is a schematic diagram illustrating an example in which a road region is mapped on a plan view in the first example embodiment. The mapping method may be, for example, mapping at a magnification at which the width of the road is the same as the road width on a frontmost side. In addition, the mapping method is not limited thereto, and may be performed using a well-known technology.

The detection of the crack and the determination of the erroneous detection, which will be described later, may be performed on an image obtained by such mapping on a plan view.

The road deterioration detection unit 33 detects a crack in the extracted road region (step S103). Here, the road deterioration detection unit 33 detects a crack on the road surface using, for example, an image recognition technology. In this case, as the image recognition technology, AI obtained by learning an image of a crack on a road surface by machine learning or deep learning may be used.

Figure 8:
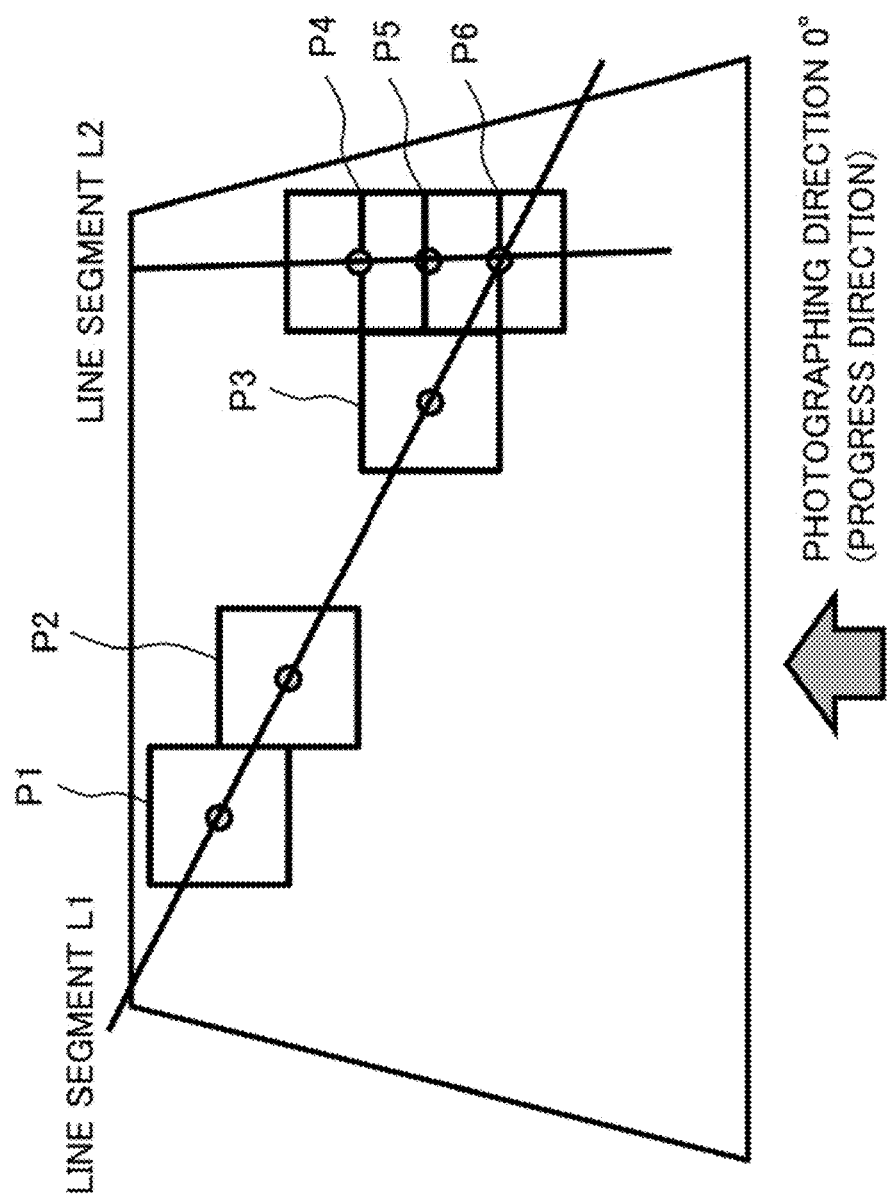
FIG. 8 is a diagram for describing an example of a method of calculating a crack direction (orientation) in the first example embodiment.

The road deterioration detection unit 33 determines a crack direction (orientation) (step S104). Here, the road deterioration detection unit 33 may detect target patches (hereinafter, also referred to as patch line) arranged in a straight line by using, for example, the Hough transform described above, and determine the direction (orientation) of the crack. FIG. 8 is a diagram for describing an example of a method of calculating a crack direction (orientation) in the first example embodiment. FIG. 8 illustrates a plurality of target patches P1 to P6 and a point indicating the center of the target patches. For these target patches, the road deterioration detection unit 33 may detect a patch line in which points at the center of the target patch are arranged in a straight line by using, for example, the Hough transform. In this case, as illustrated in FIG. 8, the road deterioration detection unit 33 detects a line segment L1 indicating a patch line of target patches P1 to P3 and P6 and a line segment L2 indicating patch lines of target patches P4 to P6.

The road deterioration detection unit 33 calculates the angle between the direction (orientation) of the line segment L1 and the line segment L2 and the capturing direction using the capturing direction (That is, the traveling direction) at this point. The angle between each line segment and the capturing direction may be obtained by image analysis using a line segment on the analysis image and a line segment in the virtual capturing direction. In addition, the angle between each line segment and the capturing direction may also be obtained, for example, from a parameter (inclination of a linear expression) of an expression of a line segment L1 and the capturing direction without using the image analysis.

For example, in FIG. 8, it is assumed that the capturing direction is 0°, and the angle between the capturing direction and the direction of the line segment L1 is, for example, 60° counterclockwise. In this case, the road deterioration detection unit 33 calculates the direction (orientation) of the line segment L1 as 300°. In addition, the angle between the capturing direction and the direction of the line segment L2 is, for example, 0°. In this case, the road deterioration detection unit 33 calculates the direction (orientation) of the line segment L2 as 0°.

The shadow direction calculation unit 34 estimates the location of the sun using the capturing date, the capturing point, and the capturing time relevant to the image being analyzed (step S105). Here, a general method of calculating a location of the sun is used, but other calculation methods may be used. As the general method of calculating a location of the sun, there is a method of using a sun attitude and a sun azimuth. For this method, for example, "Calculation of Sun Position" (URL: https://www.metds.co.jp/wp-content/uploads/2019/03/TE_SunPosition_160401.pdf) generally available as a technical comment on a homepage of Weather Data System Co., Ltd., or "Method of obtaining schematic values of altitude, azimuth, and shadow location of the sun" (URL: https://eco.mtk.nao.ac.jp/koyomi/topics/html/topics2005.html) on a homepage of National Astronomical Observatory of Japan can be referred to. In this method, first, the sun attitude is calculated, and the sun azimuth is calculated using the calculated sun altitude.

The shadow direction calculation unit 34 estimates a shadow direction, which is a direction in which a shadow of a structure may be formed, using the sun azimuth among the estimated locations of the sun (step S106). The shadow direction calculation unit 34 calculates the shadow direction by obtaining a direction 180° opposite to the sun azimuth. For example, when the sun azimuth is calculated to be 125°, the shadow direction calculation unit 34 calculates the shadow direction to be 305°.

Figure 9:
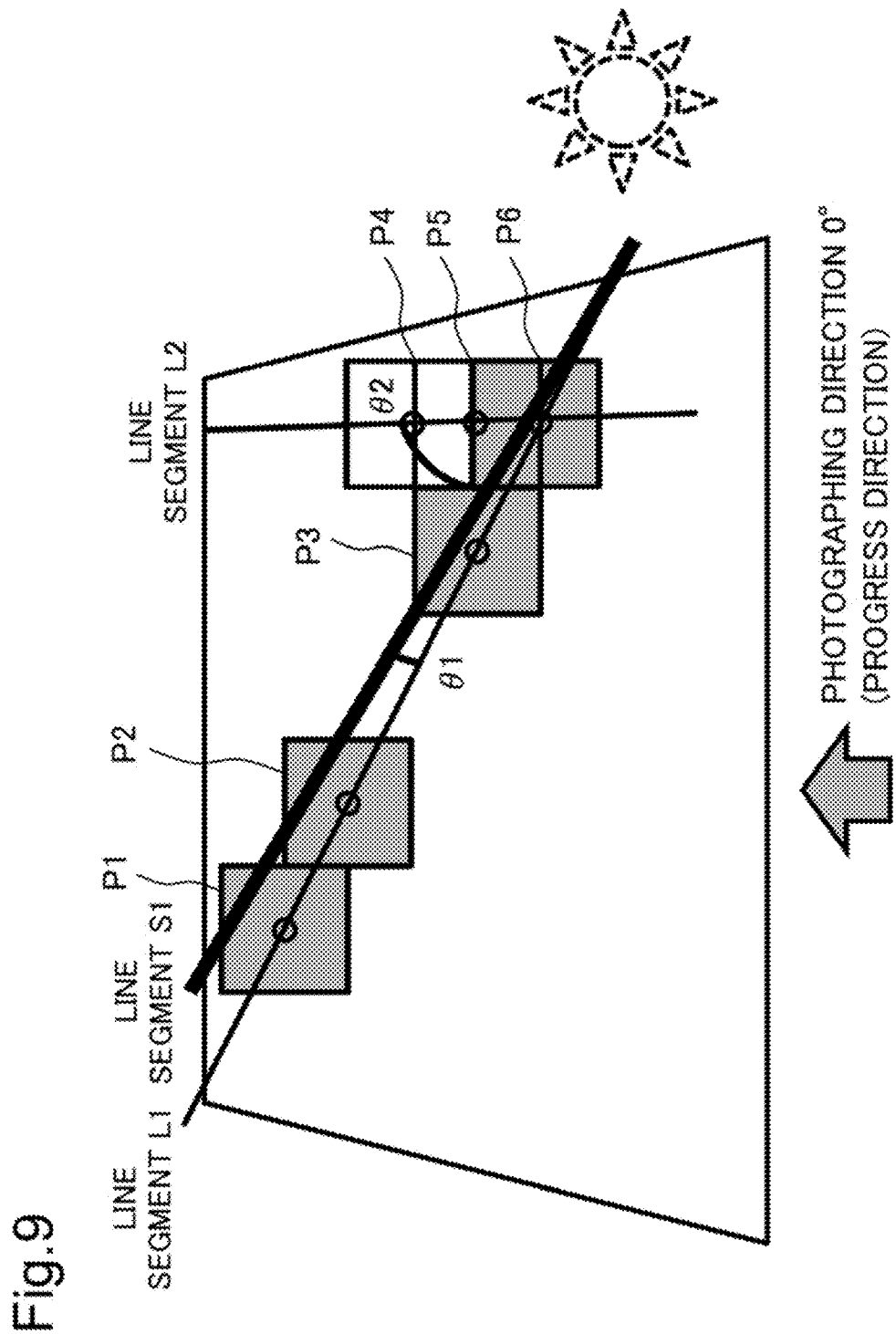
FIG. 9 is an example illustrating a relationship between a direction (orientation) of a patch line and a shadow direction in the first example embodiment.

The erroneous detection determination unit 35 compares the direction (orientation) of the patch line with the shadow direction and calculates an angle θ of these directions (orientations) (step S107). FIG. 9 is an example illustrating a relationship between a direction (orientation) of a patch line and a shadow direction in the first example embodiment. FIG. 9 illustrates line segments L1 and L2 indicating the direction (orientation) of the patch line, a line segment S1 indicating the shadow direction calculated by the shadow direction calculation unit 34, an angle θ1 between the line segment L1 and the line segment S1, and an angle θ2 between the line segment L2 and the line segment S1. For example, in FIG. 9, when the direction (orientation) of the line segment L1 indicating the patch lines of the target patches P1 to P3 and P6 is 300° and the shadow direction is 305°, the erroneous detection determination unit 35 calculates the angle θ1 as 5°. In addition, when the direction (orientation) of the line segment L2 indicating the patch lines of the target patches P4 to P6 is 0° and the shadow direction is 305°, the erroneous detection determination unit 35 calculates the angle θ2 as 55°.

The erroneous detection determination unit 35 determines whether the detection of the crack indicated by the patch line is erroneous detection based on the angle θ (step S108). For example, when the angle θ has a predetermined threshold of 10°, in the example of FIG. 9 described above, since the angle θ1 between the line segment L1 and the line segment S1 is 5°, the erroneous detection determination unit 35 determines that the detected crack is highly likely to be a shadow of a structure, and determines that the detection of the crack is erroneous detection. In addition, in the example of FIG. 9 described above, since the angle θ2 between the line segment L2 and the line segment S1 is 55°, the erroneous detection determination unit 35 determines that the detected crack is less likely to be a shadow of a structure, and determines that the detection of the crack is not erroneous detection.

The display control unit 36 displays the crack detected by the road deterioration detection unit 33 and the determination result regarding the detected crack on the display device (step S109). In order to call attention to the operator, for example, the display control unit 36 may blink a target patch indicating a crack determined to be erroneously detected.

Thus, the operation of the first example embodiment is completed.

In the present example embodiment, as illustrated in FIG. 9, a line segment indicating a patch line and a line segment indicating a shadow direction are calculated by calculation processing, and it is determined whether the detected crack is erroneously detected from an angle between the line segments. However, it may be determined whether the detected crack is erroneously detected by displaying these line segments on the analysis image and determining an angle between the line segments on the image. In this case, the display control unit 36 may display a line segment indicating a patch line, acquire a shadow direction from the shadow direction calculation unit 34, and superimpose a line segment indicating the shadow direction on the line segment. By doing so, the erroneous detection determination unit 35 can determine the angle θ from the image displayed by the display control unit 36.

Figure 10:
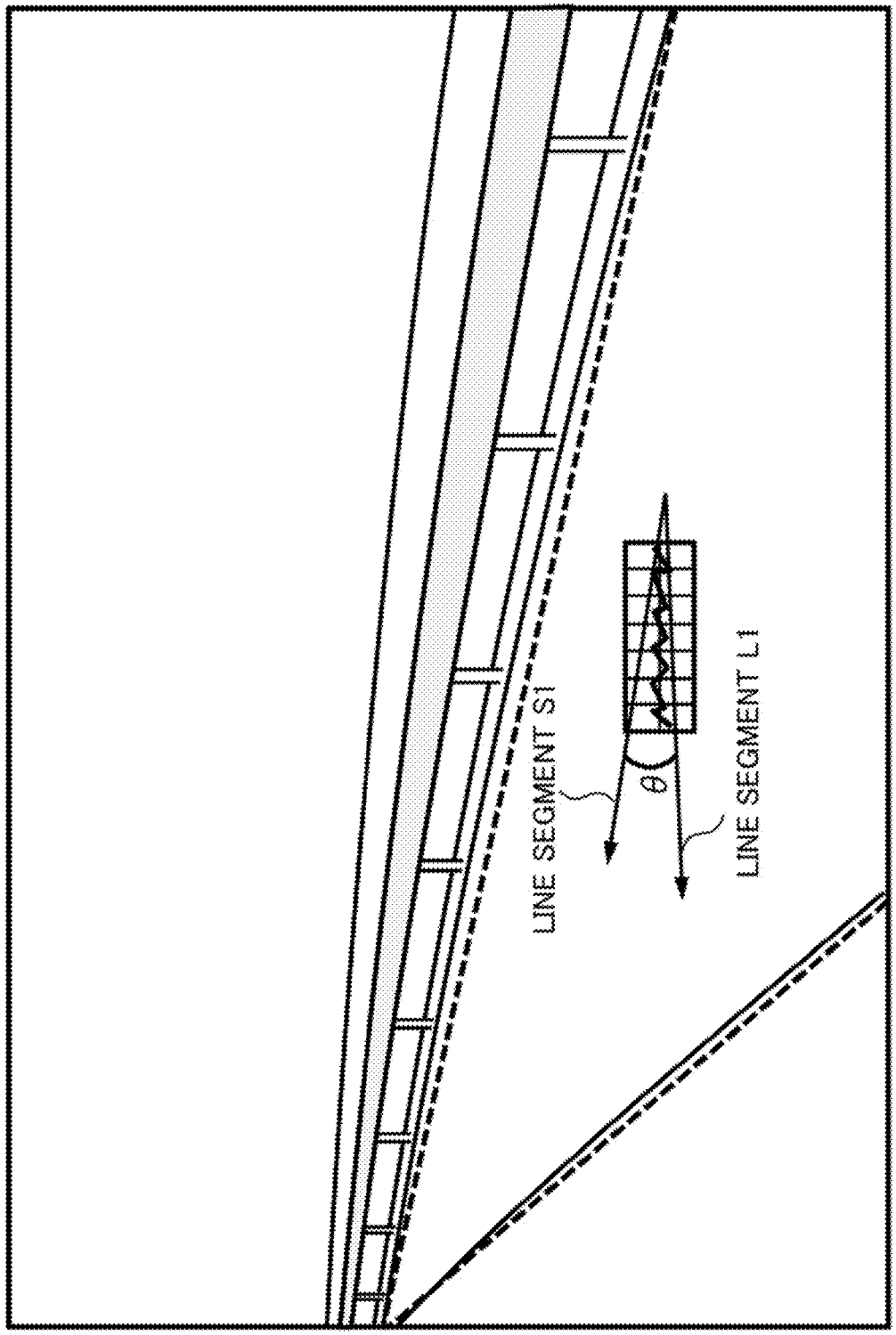
FIG. 10 illustrates road deterioration (cracking) by an image recognition technology, and is an example in which a line segment indicating a shadow direction is superimposed on a line segment indicating a direction of a patch line in the first example embodiment.

FIG. 10 illustrates an example in which a line segment indicating a shadow direction is superimposed on a line segment indicating a direction of a patch line detected for road deterioration (cracking) by an image recognition technology in the first example embodiment. Referring to FIG. 10, the line segment S1 indicating the shadow direction is superimposed on the line segment L1 indicating a direction (orientation) of a plurality of target patches indicating the detected crack.

By displaying in this way, the erroneous detection determination unit 35 can easily recognize the angle θ between both line segments. Furthermore, in the above description, the shadow direction is indicated by the line segment, but any display method may be used as long as the shadow direction is indicated.

Next, effects of the first example embodiment will be described.

According to the first example embodiment, it is possible to inexpensively and easily prevent the erroneous detection of the road deterioration due to the shadow of the structure.

The reason is that the road deterioration diagnosing device 30 acquires an image capturing a road and image information including a date, a location, a time, and a direction when the image is captured, detects the deterioration of the road surface shown in the acquired image, calculates, using the image information, the direction in which the shadow of the structure on the road surface of the image may be formed, and determines the possibility of the erroneous detection of the deterioration of the road surface due to the shadow based on the angle formed by the direction in which the road surface deteriorates and the direction in which the shadow may be formed.

Second Example Embodiment

A second example embodiment will be described.

The second example embodiment is different from the first example embodiment in determining whether a shadow is formed from a structure located near a detected crack in addition to a direction in which a shadow of a structure may be formed.

Figure 11:
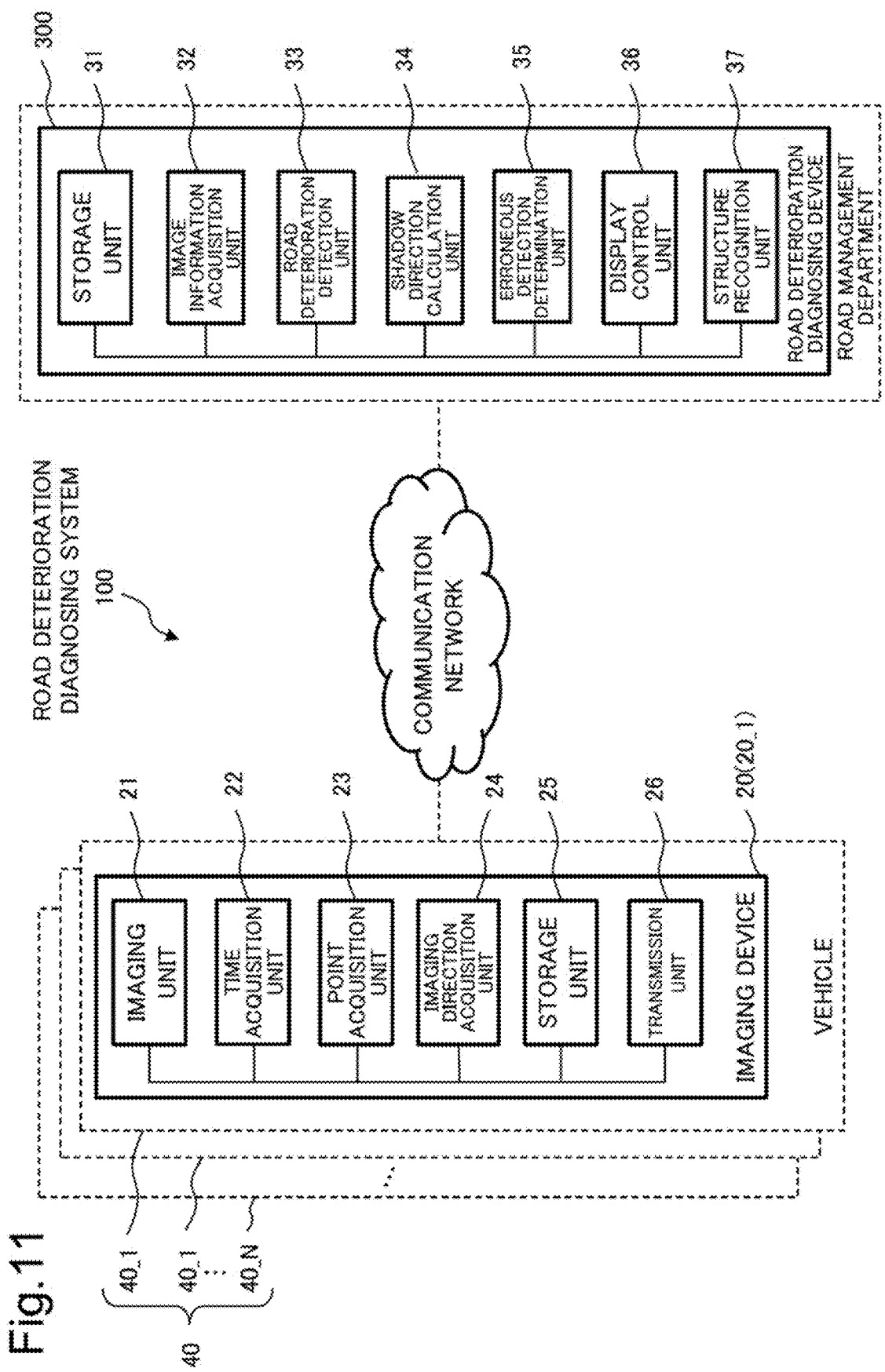
FIG. 11 is a block diagram illustrating an example of a configuration of a road deterioration diagnosing system 100 according to a second example embodiment.

A configuration of a road deterioration diagnosing system according to a second example embodiment will be described. FIG. 11 is a block diagram illustrating an example of a configuration of a road deterioration diagnosing system 100 according to the second example embodiment. In the second example embodiment, parts similar to those in the first example embodiment are denoted by the same reference numerals, description thereof will be omitted, and only different parts will be described.

(Configuration of Road Deterioration Diagnosing Device)

The road deterioration diagnosing device 300 includes a storage unit 31, an image information acquisition unit 32, a road deterioration detection unit 33, a shadow direction calculation unit 34, an erroneous detection determination unit 35, a display control unit 36, and a structure recognition unit 37. The structure recognition unit 37 is an example embodiment of a structure recognition means in the present disclosure.

The structure recognition unit 37 recognizes a structure around a road in an image analyzed by the road deterioration detection unit 33. It is preferable that the structure recognition unit 37 recognizes a structure that can cast a shadow on the road surface of the extracted road region, for example, from the location of the sun and the direction of the shadow. Examples of such a structure include utility poles, signs, electric wires, street lights, trees, and the like. The structure recognition unit 37 recognizes the structure as described above using, for example, an image recognition technology. In this case, as the image recognition technology, for example, AI obtained by learning images of structures such as utility poles, signs, electric wires, street lights, and trees by machine learning or deep learning may be used.

The erroneous detection of the detected crack is determined according to a result of comparison between an angle θ formed by a shadow direction (hereinafter, also described as a shadow direction of a structure origin) starting from a contact point between a road surface and a structure recognized by the structure recognition unit 37 and a direction of a patch line, and a length (hereinafter, also described as the length of the shadow at the structure origin) of the shadow starting from the contact point between the structure and the road surface and a length of the patch line. In a case where the angle formed by the shadow direction of the structure origin and the direction of the patch line is equal to or less than a predetermined threshold, and further, the difference between the length of the shadow at the structure origin and the length of the patch line is equal to or less than a predetermined threshold, the erroneous detection determination unit 35 determines that the detected crack is erroneous detection. In addition, in a case where the angle θ formed by the shadow direction of the structure origin and the direction of the patch line is equal to or greater than a predetermined threshold, and further, the difference between the length of the shadow at the structure origin and the length of the patch line is equal to or greater than a predetermined threshold, the erroneous detection determination unit 35 determines that the detected crack is not erroneous detection.

As in the first example embodiment, the display control unit 36 displays a detection result of road deterioration on a display device (not illustrated), for example, a display.

Next, an operation of the second example embodiment will be described.

(Road Deterioration Diagnosis Processing)

Figure 12:
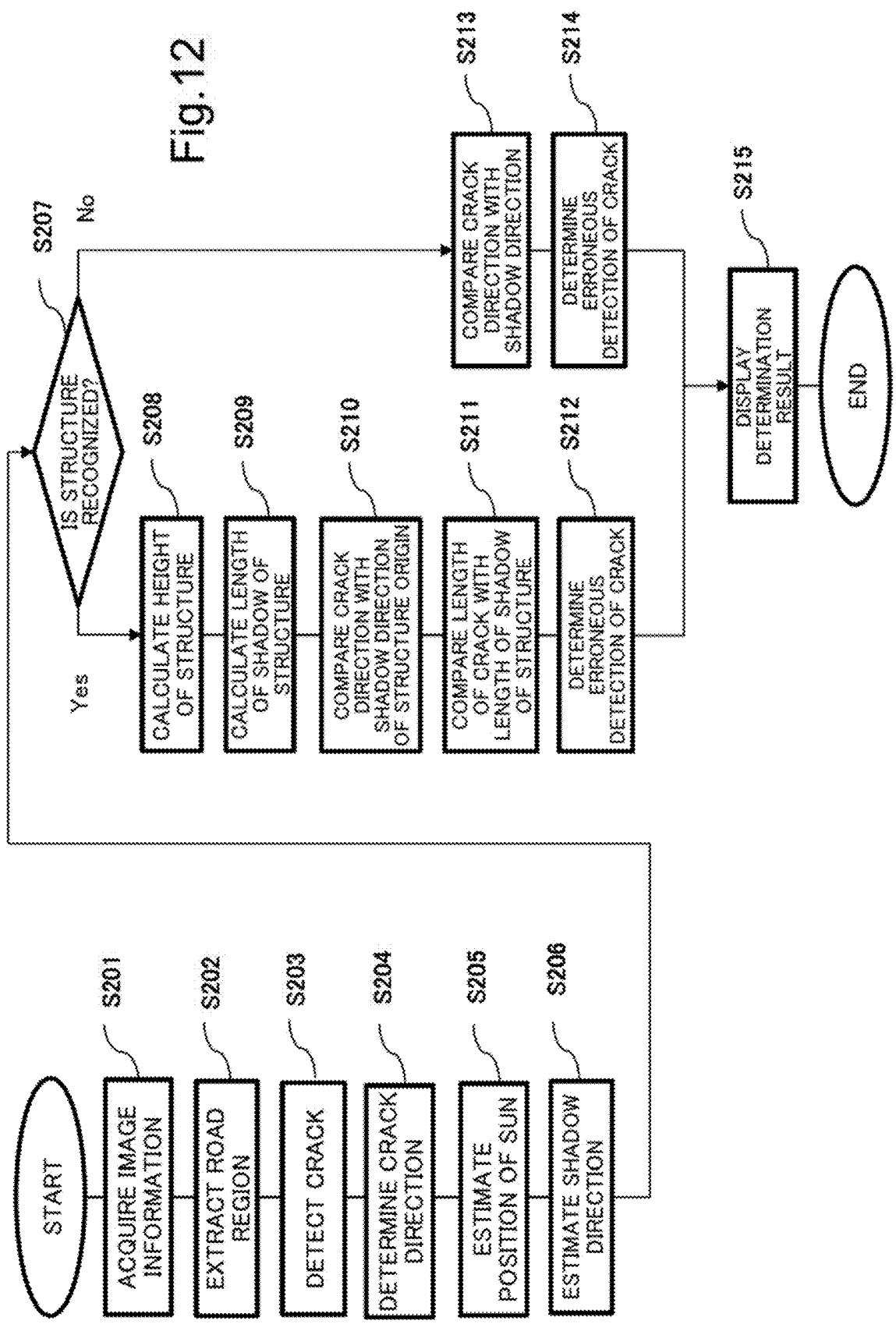
FIG. 12 is a flowchart of road deterioration diagnosis processing according to the second example embodiment.

FIG. 12 is a flowchart of road deterioration diagnosis processing according to the second example embodiment. Processing (steps S201 to S206) from image information acquisition to shadow direction estimation in the road deterioration diagnosis processing of the second example embodiment is the same as that in steps S101 to S106 in the road deterioration diagnosis processing of the first example embodiment.

Figure 13:
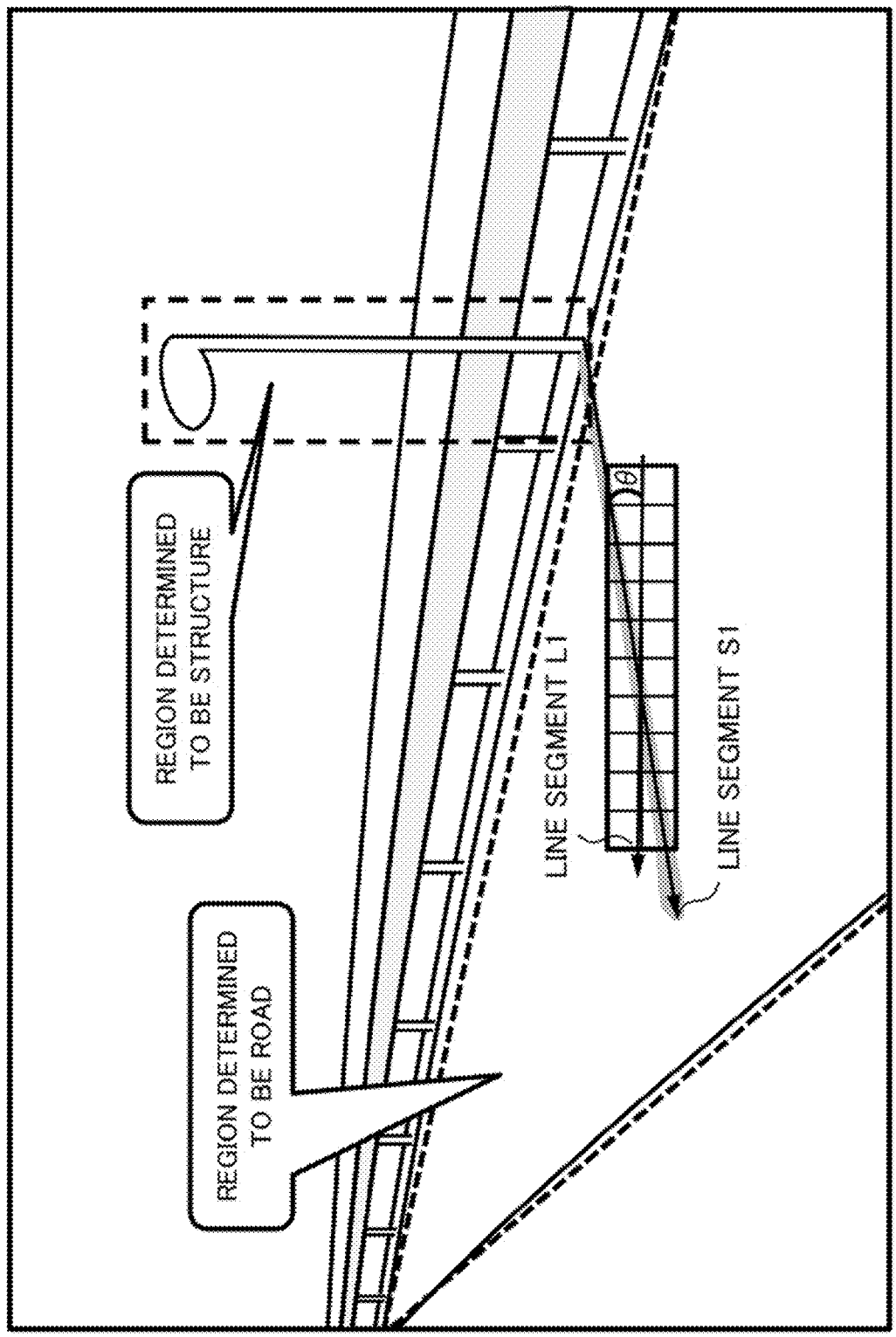
FIG. 13 is a diagram illustrating an example in which a structure around a road is recognized in the second example embodiment.

Next, the structure recognition unit 37 recognizes a structure around a road in an image analyzed by the road deterioration detection unit 33 (step S207). FIG. 13 is a diagram illustrating an example in which a structure around a road is recognized in the second example embodiment. In FIG. 13, the structure recognition unit 37 recognizes a street light beside a road as a structure, and the surroundings of the street light is surrounded by a rectangle as a region of the structure. In addition, in FIG. 13, the road deterioration detection unit 33 extracts a road region, and a plurality of target patches is displayed at a place where a crack is detected on a road surface.

When the structure around the road can be recognized (step S207/Yes), the structure recognition unit 37 calculates a height of the structure (step S208). The structure recognition unit 37 calculates the height of the recognized structure using, for example, an image recognition technology. In this case, as the image recognition technology, for example, AI obtained by learning images of structures such as utility poles, signs, electric wires, street lights, and trees and the heights of the structures by machine learning or deep learning may be used.

The structure recognition unit 37 calculates the length of the shadow of the structure (step S209). The structure recognition unit 37 calculates the length of the shadow of the structure using the sun altitude and the height of the structure. The structure recognition unit 37 compares a direction of arrangement of the detected cracks, that is, the direction of the patch line, with the shadow direction of the structure origin (step S210). Further, the structure recognition unit 37 compares the length of the patch line with the length of the shadow at the structure origin (step S211). Referring to FIG. 13, a line segment S1 indicating the shadow direction and the shadow length of the structure origin and a line segment L1 indicating the direction and the length of the patch line are illustrated. As a comparison result, the erroneous detection determination unit 35 acquires an angle θ formed by the line segment L1 and the line segment S1 as illustrated in FIG. 13. The angle θ can be acquired, for example, by calculating an inclination of the line segment on the image. In addition, as a comparison result, the erroneous detection determination unit 35 acquires a difference (hereinafter, also described as a difference in length.) between the length of the line segment S1 and the length of the line segment L1.

The erroneous detection determination unit 35 determines the erroneous detection of the detected crack according to the difference between the acquired angle and length (step S212). Assuming that the threshold of the angle θ is 10° and the threshold of the difference in length is 2 m, referring to FIG. 13, for example, in a case where the angle θ is 7° and the difference in length is 0.5 m, since the angle θ and the difference in length are also equal to or less than a predetermined threshold, the erroneous detection determination unit 35 determines that the detected crack is an erroneous detection.

When the structure around the road cannot be recognized (step S207/No), the erroneous detection determination unit 35 compares the direction (orientation) of the patch line with the shadow direction and calculates the angle θ of these directions (orientations) (step S213). Note that the comparison processing of the direction (step 213) is the same as the comparison processing of the direction (step S107) in the first example embodiment. In addition, the case where the structure recognition unit 37 cannot recognize the structure in step S207 includes, for example, a case where the structure cannot fit in the image.

The erroneous detection determination unit 35 determines whether the detection of the crack indicated by the patch line is erroneous detection based on the angle θ (step 214). Note that the determination processing of the erroneous detection (step 214) is the same as the determination processing of the erroneous detection (step S108) in the first example embodiment.

The display control unit 36 displays the crack detected by the road deterioration detection unit 33 and the determination result regarding the detected crack on the display device (step S215). In order to call attention to the operator, for example, the display control unit 36 may blink the target patch indicating the crack of which the determination result of the detection is erroneous detection.

Thus, the operation of the second example embodiment is completed.

Next, effects of the second example embodiment will be described.

According to the second example embodiment, it is possible to more accurately reduce the erroneous detection of the crack due to the shadow of the structure as compared with the first example embodiment. This is because the road deterioration diagnosing device 300 recognizes a structure around a road, calculates a location and direction of a shadow from a structure, and compares the location and the direction with the detected crack. As a result, in the first example embodiment, it is possible to exclude erroneous detection due to a small difference between the detected crack direction and the shadow direction based on the sun azimuth even though there is actually no shadow.

Third Example Embodiment

A third example embodiment will be described.

The third example embodiment is different from the first example embodiment in that reliability of crack detection is calculated.

Figure 14:
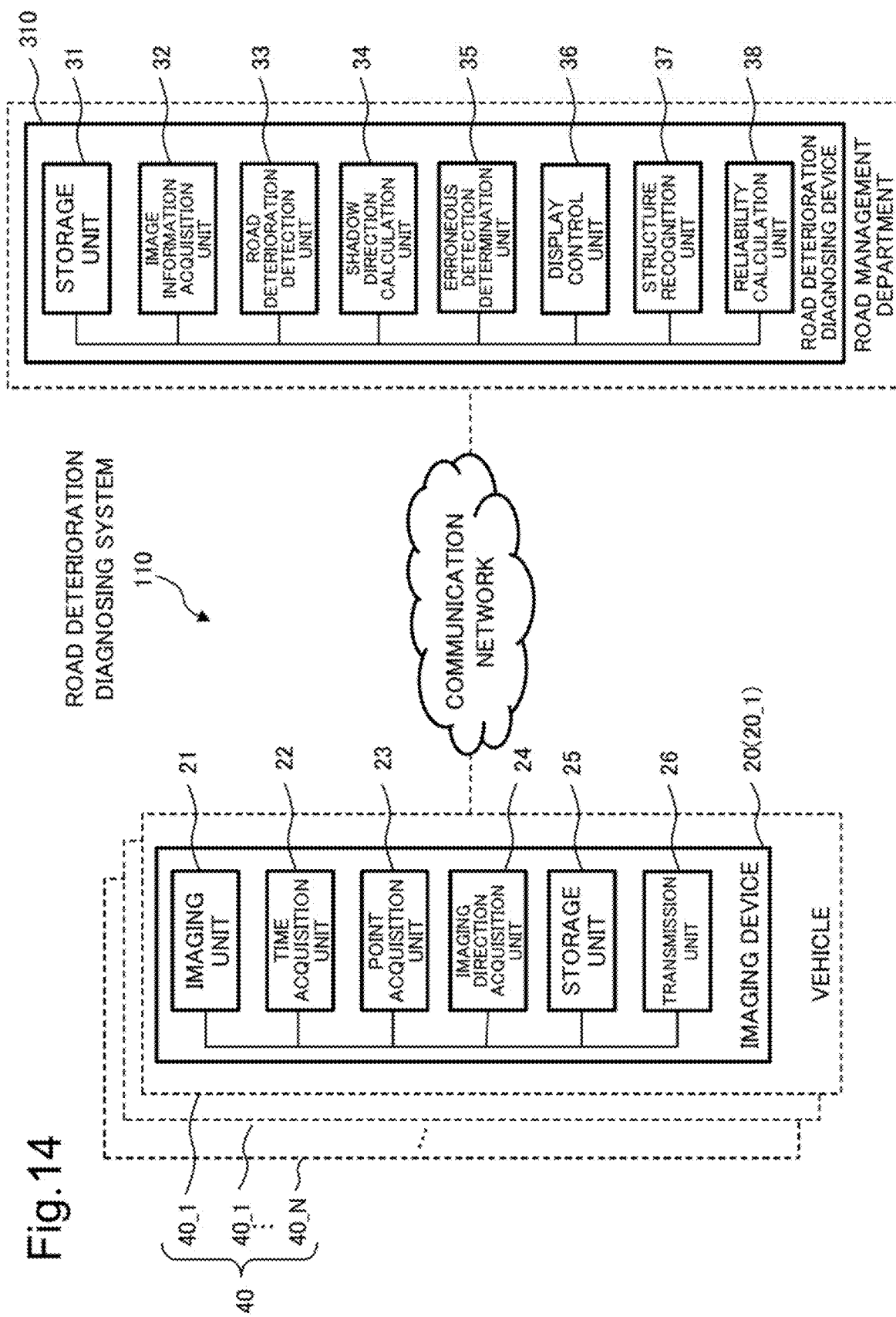
FIG. 14 is a block diagram illustrating an example of a configuration of a road deterioration diagnosing system 110 according to a third example embodiment.

A configuration of a road deterioration diagnosing system according to a third example embodiment will be described. FIG. 14 is a block diagram illustrating an example of a configuration of a road deterioration diagnosing system 110 according to the third example embodiment. In the third example embodiment, parts similar to those in the first example embodiment and the second example embodiment are denoted by the same reference numerals, description thereof will be omitted, and only different parts will be described.

(Configuration of Road Deterioration Diagnosing Device)

A road deterioration diagnosing device 300 includes a storage unit 31, an image information acquisition unit 32, a road deterioration detection unit 33, a shadow direction calculation unit 34, an erroneous detection determination unit 35, a display control unit 36, a structure recognition unit 37, and a reliability calculation unit 38. The reliability calculation unit 38 is an example embodiment of a reliability calculation means in the present disclosure.

The reliability calculation unit 38 calculates, for each target patch, a reliability average of reliability based on an angle θ formed by a shadow direction and a direction of a patch line, reliability of crack detection by an image recognition technology in the road deterioration detection unit 33, and reliability based on a difference between a length of a shadow at a structure origin and a length of the patch line. Here, the reliability based on the angle θ formed by the shadow direction and the direction of the patch line is set as reliability $\alpha 1$, the reliability of the crack detection by the image recognition technology is set as reliability $\alpha 2$, and the reliability based on the difference between the length of the shadow at the structure origin and the length of the patch line is set as reliability $\alpha 3$. Then, the average of the reliability $\alpha 1$ to the reliability $\alpha 3$ is set as the reliability $\alpha$. In addition, the reliability $\alpha$ may be calculated by weighting and summing each of the reliability $\alpha 1$ to the reliability $\alpha 3$, or a value other than the average of the reliability $\alpha 1$ to the reliability $\alpha 3$ may be used. Note that, as the reliability $\alpha$, one or more of the reliability $\alpha 1$ to the reliability $\alpha 3$ may be used, and another reliability different from the definition of the reliability $\alpha 1$ to the reliability $\alpha 3$ may be used.

The reliability $\alpha 1$ may be defined as follows according to the angle θ, for example.

$$\alpha_1 = \begin{cases} 0.1 & (\text{if } \theta < 10°) \\ 0.5 & (\text{if } 10° \leq \theta < 45°) \\ 1 & (\text{otherwise}) \end{cases} \quad \text{[Equation 1]}$$

In the image processing technology using AI or the like, for example, when a crack is detected, a probability that an image at the detection place is an image of a crack is calculated. Then, it is determined whether there is a crack according to the probability. As the reliability $\alpha 2$, a probability of being an image of a crack is used. The reliability $\alpha 2$ is defined in such a way that the higher the probability of being an image of a crack, the higher the value of the reliability. The reliability $\alpha 2$ is a value of 0 or more and 1 or less.

The reliability $\alpha 3$ is defined as reliability based on a difference between the length of the shadow at the structure origin and the length of the patch line. The reliability $\alpha 3$ is a value of 0 or more and 1 or less.

The reliability $\alpha$ is a value obtained by adding the three reliabilities $\alpha 1$ to $\alpha 3$ and dividing the sum by 3.

The display control unit 36 acquires the reliability $\alpha$ of each target patch from the reliability calculation unit 38. The display control unit 36 changes the display method of the target patch according to the acquired value of the reliability $\alpha$. For example, the display control unit 36 may change the display such as the color or blinking of the target patch according to the value of the reliability α.

Next, an operation of the third example embodiment will be described.

(Reliability Calculation Processing)

Figure 15:
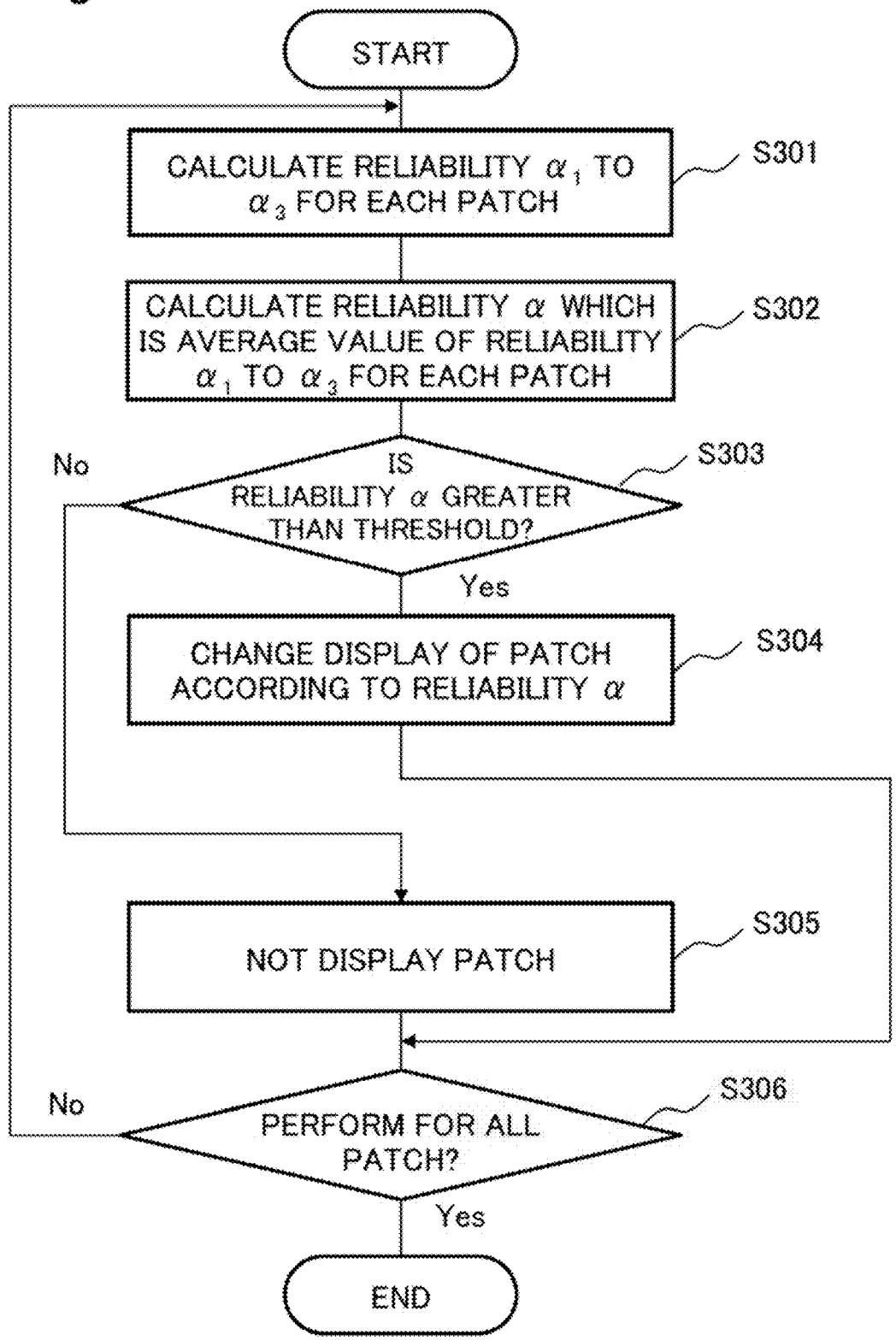
FIG. 15 is a flowchart of reliability calculation processing according to the third example embodiment.

FIG. 15 is a flowchart of reliability calculation processing according to the third example embodiment. The reliability calculation processing is executed, for example, when an operator or the like inputs an instruction to execute reliability calculation. In the input of the execution instruction, for example, the number of levels of the reliability is designated. When the number of levels is input as 3, the reliability may be set to large, medium, or small with 0.8 and 0.5 as boundaries, for example. In this case, a value that becomes a boundary of level division may be set arbitrarily.

The reliability calculation unit 38 calculates the reliabilities α1 to α3 for each target patch (step S301). The reliability calculation unit 38 calculates an average value of the reliabilities α1 to α3 for each target patch, and sets the average value as the reliability α (step S302). Here, for the target patch P10, for example, when the angle θ formed by the shadow direction and the direction of the patch line is 5°, the reliability α1 is 0.1. In addition, when the crack probability of the target patch P10 at the time of the crack detection is 0.3, the reliability α2 is also 0.3. In addition, when it is assumed that the difference between the length of the shadow at the structure origin and the length of the patch line is 0.2, the reliability α3 is also 0.2. By doing so, the reliability α is (0.1+0.3+0.2)/3, which is 0.2. Here, the reliability calculation unit 38 may output the calculated value of the reliability α to each target patch.

The reliability calculation unit 38 compares the calculated reliability α with a predetermined threshold (step S303). When the calculated reliability α is smaller than the predetermined threshold (step S303/No), the target patch having the reliability α smaller than the predetermined threshold is not displayed on the display device (step S305). When the calculated reliability α is larger than the predetermined threshold (step S303/Yes), the display of the target patch is changed according to the level of the reliability α. For example, it is assumed that the reliability α is divided into levels of large, medium, and small with 0.8 and 0.5 as boundaries. In this case, for example, the reliability calculation unit 38 may set the display color of the target patch of the reliability α to "blue" when the level of the reliability α is "large", set the display color of the target patch to "yellow" when the level of the reliability α is "medium", and set the display color of the target patch to "red" when the level of the reliability α is "low". In addition, for example, the target patch of which the level of the reliability α is "small" may be blinked.

The reliability calculation unit 38 determines whether the processing of steps S301 to S305 has been executed for all target patches in the road region (step S306). When the processing of steps S301 to S305 is not executed for all the target patches (step S306/No), the processing from step S301 is repeated. When the processing of steps S301 to S305 is executed for all the patches (step S306/Yes), the reliability calculation unit 38 ends the road deterioration diagnosis processing.

Thus, the operation of the third example embodiment is completed.

In the present example embodiment, the reliability calculation unit 38 calculates the reliability, but the reliability calculation unit 38 may further calculate a cracking rate using the reliability. In this case, the reliability calculation unit 38 may calculate the cracking rate according to the following Equation.

$$hibi_{rate}[\%] = \frac{\sum_{totalpatch} \text{Area of patch indicating detected crack Reliability of each patch}}{\text{Area of extracted road area}} \quad \text{[Equation 2]}$$

Here, the area of the road region and the area of each target patch are calculated, for example, by counting the number of dots or the number of pixels in each region on the image.

Next, effects of the third example embodiment will be described.

According to the third example embodiment, the operator can determine the reliability of the detected crack. The reason is that the road deterioration diagnosing device 300 calculates reliability based on a plurality of indexes for the detected crack.

Fourth Example Embodiment

A fourth example embodiment will be described.

Figure 16:
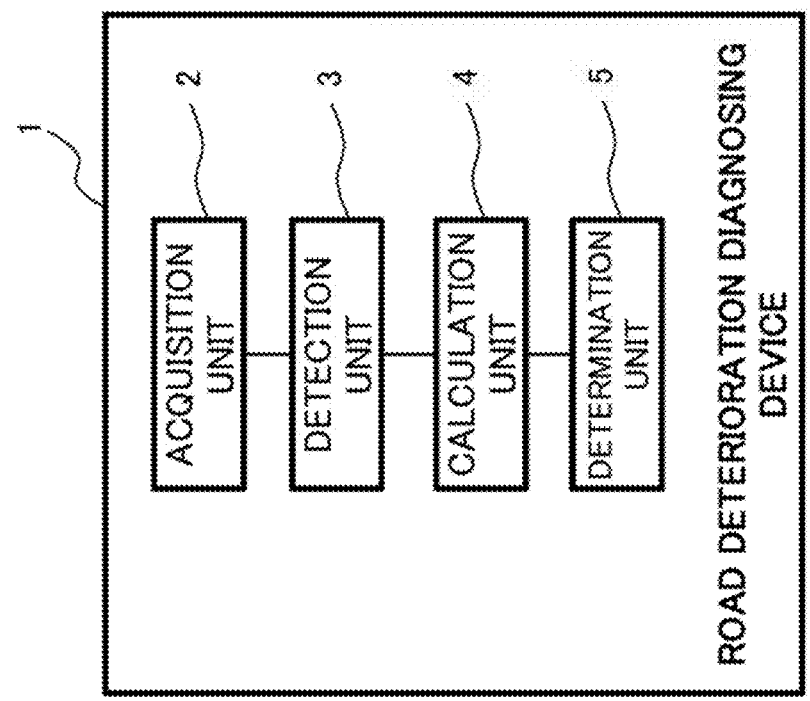
FIG. 16 is a block diagram illustrating an example of a configuration of a road deterioration diagnosing device 1 according to a fourth example embodiment.

FIG. 16 is a block diagram illustrating an example of a configuration of a road deterioration diagnosing device 1 according to a fourth example embodiment.

Referring to FIG. 16, the road deterioration diagnosing device 1 includes an acquisition unit 2, a detection unit 3, a calculation unit 4, and a determination unit 5. The acquisition unit 2, the detection unit 3, the calculation unit 4, and the determination unit 5 are an example embodiment of an acquisition means, a detection means, a calculation means, and a determination means, respectively.

The acquisition unit 2 acquires an image capturing a road, and a date, a location, a time, and a direction in which the image is captured. The detection unit 3 detects the deterioration of the road surface shown in the acquired image. The calculation unit 4 uses the date, the location, the time, and the direction to calculate a direction in which the shadow of the structure may be formed on the road surface of the image. The determination unit 5 determines the possibility of erroneous detection of deterioration based on the direction in which the road surface deteriorates and the direction in which the shadow may be formed.

Next, effects of the fourth example embodiment will be described.

According to the fourth example embodiment, it is possible to inexpensively and easily prevent the erroneous detection of the road deterioration due to the shadow of the structure. The reason is that a road deterioration diagnosing device 1 acquires an image capturing a road and a date and a time when the image was captured as well as a location and a direction in which the image was captured, detects deterioration of the road surface shown in the acquired image, calculates a direction in which a shadow of a structure may be formed over the road surface shown in the image using the date, the time, the location, and the direction, and determines a possibility of erroneous detection of the deterioration on the basis of the direction in which the road surface deteriorates and the direction in which the shadow may be formed.

(Hardware Configuration)

In the above-described example embodiments, each component of each device (imaging device 20, road deterioration diagnosing devices 30, 300, 310, etc.) indicates a block of a functional unit. A part or all of each component of each device may be achieved by an arbitrary combination of a computer 500 and a program.

Figure 17:
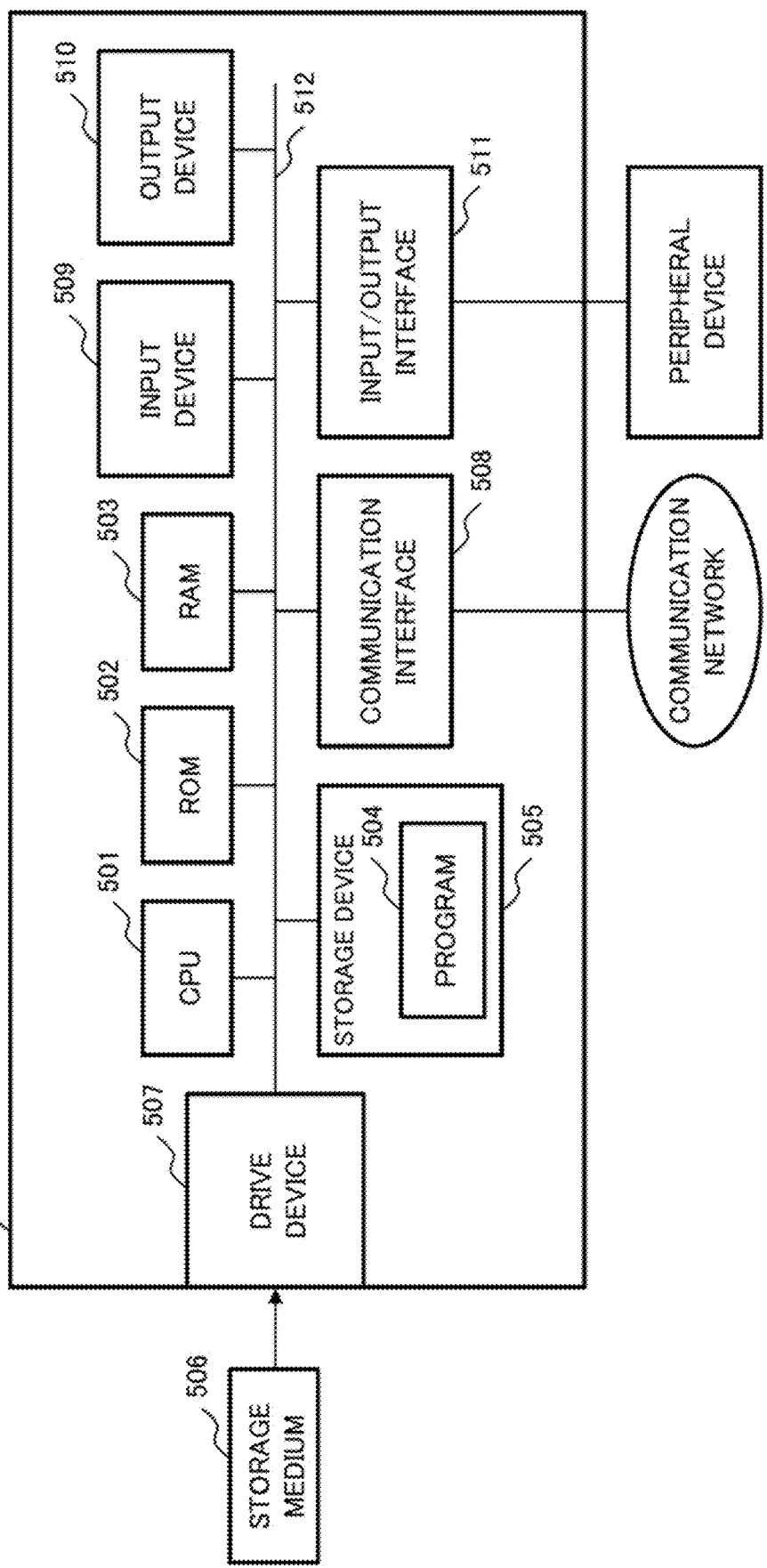
FIG. 17 is a block diagram illustrating an example of a hardware configuration of a computer 500.

FIG. 17 is a block diagram illustrating an example of a hardware configuration of the computer 500. Referring to FIG. 17, the computer 500 includes, for example, a central processing unit (CPU) 501, a read only memory (ROM) 502, a random access memory (RAM) 503, a program 504, a storage device 505, a drive device 507, a communication interface 508, an input device 509, an output device 510, an input/output interface 511, and a bus 512.

The program 504 includes an instruction for achieving each function of each device. The program 504 is stored in advance in the ROM 502 or the RAM 503, and the storage device 505. The CPU 501 achieves each function of each device by executing instructions included in the program 504. For example, the CPU 501 of the road deterioration diagnosing device 310 executes a command included in the program 504 to implement functions of the image information acquisition unit 32, the road deterioration detection unit 33, the shadow direction calculation unit 34, the erroneous detection determination unit 35, the display control unit 36, the structure recognition unit 37, the reliability calculation unit 38, and the like. In addition, for example, the RAM 503 of the road deterioration diagnosing device 310 may store data of the storage unit 31.

The drive device 507 reads and writes the recording medium 506. The communication interface 508 provides an interface with a communication network. The input device 509 is, for example, a mouse, a keyboard, or the like, and receives an input of information from an operator or the like. The output device 510 is, for example, a display, and outputs (displays) information to an operator or the like. The input/output interface 511 provides an interface with a peripheral device. The bus 512 connects the respective components of the hardware. Note that the program 504 may be supplied to the CPU 501 via a communication network, or may be stored in the recording medium 506 in advance, read by the drive device 507, and supplied to the CPU 501.

Note that the hardware configuration illustrated in FIG. 17 is an example, and other components may be added or some components may not be included.

There are various modifications of the implementation method of each device. For example, each device may be achieved by an arbitrary combination of a computer and a program different for each component. In addition, a plurality of components included in each device may be achieved by an arbitrary combination of one computer and a program.

In addition, some or all of the components of each device may be achieved by general-purpose or dedicated circuitry including a processor or the like, or a combination thereof. These circuits may be configured by a single chip or may be configured by a plurality of chips connected via a bus. A part or all of each component of each device may be achieved by a combination of the above-described circuit or the like and a program.

In addition, in a case where a part or all of each component of each device is achieved by a plurality of computers, circuits, and the like, the plurality of computers, circuits, and the like may be arranged in a centralized manner or in a distributed manner.

In addition, the road deterioration diagnosing devices 30, 300, and 310 may be disposed in the vehicle 40, disposed in a place different from the vehicle 40, and connected to the imaging device 20 via a communication network.

While the present disclosure has been particularly shown and described with reference to example embodiments thereof, the present disclosure is not limited to these example embodiments. It will be understood by those of ordinary skill in the art that various changes in form and details may be made therein without departing from the spirit and scope of the present disclosure as defined by the claims. In addition, the configurations in the respective example embodiments can be combined with each other without departing from the scope of the present disclosure.

For example, in each of the above-described example embodiments, the case where the road deterioration is a crack has been described as an example, but the road deterioration may be other than a crack as long as the deterioration is linearly detected as in the above-described patch line.

This application claims priority based on Japanese Patent Application No. 2020-062852 filed on Mar. 31, 2020, the entire disclosure of which is incorporated herein.

REFERENCE SIGNS LIST 1, 30, 300, 310 Road deterioration diagnosing device
2 Acquisition unit
3 Detection unit
4 Calculation unit
5 Determination unit
10, 100, 110 Road deterioration diagnosing system
20 Imaging device
21 Imaging unit
22 Time acquisition unit
23 Point acquisition unit
24 Capturing direction acquisition unit
25, 31 Storage unit
26 Transmission unit
32 Image information acquisition unit
33 Road deterioration detection unit
34 Shadow direction calculation unit
35 Erroneous detection determination unit
36 Display control unit
37 Structure recognition unit
38 Reliability calculation unit
40 Vehicle
500 Computer
501 CPU
502 ROM
503 RAM
504 Program
505 Storage device
506 Recording medium
507 Drive device
508 Communication interface
509 Input device
510 Output device
511 Input/output interface
512 Bus

What is claimed is:

1. A road deterioration diagnosing device, comprising:
a memory storing instructions; and
one or more processors configured to execute the instructions to:
acquire an image capturing a road, and a date, a location, a time, and a direction in which the image is captured;
detect deterioration of a road surface shown in the acquired image;
calculate a direction of a possible shadow using the date, the location, the time and the direction acquired, the possible shadow being a shadow of a structure that may be formed on the road surface of the acquired image; and determine a possibility of erroneous detection of the deterioration based on a direction in which the road surface deteriorates and the direction of the possible shadow.

2. The road deterioration diagnosing device according to claim 1, further comprising:
the one or more processors are further configured to execute the instructions to:
recognize the structure from the acquired image,
calculate a direction and a length of the possible shadow of the structure recognized, and
determine the possibility of the erroneous detection of the deterioration based on a direction and a length of the deterioration of the road surface and the direction and the length of the possible shadow of the structure recognized.

3. The road deterioration diagnosing device according to claim 1, wherein
the deterioration of the road surface is linear.

4. The road deterioration diagnosing device according to claim 1, wherein
the structure is any one of a utility pole, a sign, an electric wire, a street light, and a tree.

5. The road deterioration diagnosing device according to claim 1, wherein
the one or more processors are further configured to execute the instructions to: determine that there is a high possibility of the erroneous detection of the deterioration in a case that an angle formed by the direction in which the road surface deteriorates and the direction of the possible shadow is equal to or less than a predetermined threshold.

6. The road deterioration diagnosing device according to claim 5, wherein
the one or more processors are further configured to execute the instructions to:
determine that there is the high possibility of the erroneous detection of the deterioration in a case that a difference between the length of the shadow and the length of the deterioration is equal to or less than a predetermined threshold.

7. The road deterioration diagnosing device according to claim 6, wherein
the one or more processors are further configured to execute the instructions to: calculate reliability of the detected deterioration by using at least one of reliability based on the angle, detection reliability of the deterioration, and reliability based on the difference;
output the reliability.

8. The road deterioration diagnosing device according to claim 7, wherein
the one or more processors are further configured to execute the instructions to:
extract a road region in the acquired image, and detect a crack as the deterioration in each partial region of a road surface of the extracted road region, and
calculate a cracking rate by using an area of the road region, an area of each partial region where the deterioration is detected, and reliability of the deterioration of each partial region.

9. A road deterioration diagnosing method, comprising:
acquiring an image capturing a road surface, and a date, a location, a time, and a direction in which the image is captured,
detecting deterioration of a road surface shown in the acquired image;
calculating a direction of a possible shadow using the date, the location, the time and the direction acquired, the possible shadow being a shadow of a structure that may be formed on the road surface of the acquired image; and
determining a possibility of erroneous detection of the deterioration based on a direction in which the road surface deteriorates and the direction of the possible shadow.

10. A non-transitory computer-readable recording medium storing a program allowing a computer to:
acquire an image capturing a road surface, and a date, a location, a time, and a direction in which the image is captured;
detect deterioration of a road surface of the acquired image;
calculate a direction of a possible shadow using the date, the location, the time and the direction acquired, the possible shadow being a shadow of a structure that may be formed on the road surface of the acquired image; and
determine a possibility of erroneous detection of the deterioration based on a direction in which the road surface deteriorates and the direction of the possible shadow.

* * * * *